US008286183B2

(12) United States Patent
Baird et al.

(10) Patent No.: US 8,286,183 B2
(45) Date of Patent: Oct. 9, 2012

(54) TECHNIQUES FOR TASK MANAGEMENT USING PRESENCE

(75) Inventors: Randall Baird, Austin, TX (US); Labhesh Patel, San Francisco, CA (US); Denise Caballero-Mccann, Raleigh, NC (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1830 days.

(21) Appl. No.: 11/255,828

(22) Filed: Oct. 22, 2005

(65) Prior Publication Data

US 2007/0094661 A1 Apr. 26, 2007

(51) Int. Cl.
*G06F 9/46* (2006.01)
*H04L 12/16* (2006.01)

(52) U.S. Cl. ........ 718/107; 718/100; 718/102; 718/103; 718/104; 370/260

(58) Field of Classification Search .................. 718/100, 718/102, 104, 107, 101, 103; 370/260
See application file for complete search history.

(56) References Cited

U.S. PATENT DOCUMENTS

| | | | | |
|---|---|---|---|---|
| 5,890,134 A | * | 3/1999 | Fox | 705/9 |
| 5,963,913 A | * | 10/1999 | Henneuse et al. | 705/9 |
| 6,085,166 A | * | 7/2000 | Beckhardt et al. | 705/9 |
| 6,938,240 B2 | | 8/2005 | Charisius et al. | |
| 6,941,514 B2 | | 9/2005 | Bradford | |
| 6,954,737 B2 | * | 10/2005 | Kalantar et al. | 705/50 |
| 7,876,714 B2 | * | 1/2011 | Ethier et al. | 370/260 |
| 7,881,232 B2 | * | 2/2011 | Bieselin et al. | 370/260 |
| 7,881,233 B2 | * | 2/2011 | Bieselin | 370/260 |
| 8,126,992 B2 | * | 2/2012 | Andreev et al. | 709/223 |
| 2002/0016729 A1 | * | 2/2002 | Breitenbach et al. | 705/9 |
| 2003/0135565 A1 | * | 7/2003 | Estrada | 709/206 |
| 2004/0001446 A1 | * | 1/2004 | Bhatia et al. | 370/261 |
| 2004/0064355 A1 | * | 4/2004 | Dorenbosch et al. | 705/9 |
| 2004/0199580 A1 | * | 10/2004 | Zhakov et al. | 709/204 |
| 2005/0152524 A1 | * | 7/2005 | Carlson et al. | 379/202.01 |
| 2005/0180342 A1 | * | 8/2005 | Summers et al. | 370/261 |
| 2006/0047557 A1 | * | 3/2006 | Bieselin et al. | 705/9 |
| 2006/0067250 A1 | * | 3/2006 | Boyer et al. | 370/260 |

* cited by examiner

*Primary Examiner* — Emerson Puente
*Assistant Examiner* — Willy W Huaracha
(74) *Attorney, Agent, or Firm* — Brinks Hofer Gilson & Lione

(57) ABSTRACT

Techniques for scheduling a task include receiving task data and quorum data. Task data describes tasks to be performed by one or more participants. Quorum data indicates a participant set of one or more participants to perform each task. Current user data may also be received. Current user data describes a current task set of one or more tasks currently being performed by a particular participant. Either or both of the task data and the current user data describe interruptibility through a particular medium of a plurality of communications media. A particular time interval to schedule a particular task is determined based at least in part on the interruptibility of the task or the particular participant. These techniques allow either or both unscheduled tasks and previously scheduled tasks to be moved to time intervals that overlap other scheduled tasks, including tasks currently being performed by a participant.

63 Claims, 11 Drawing Sheets

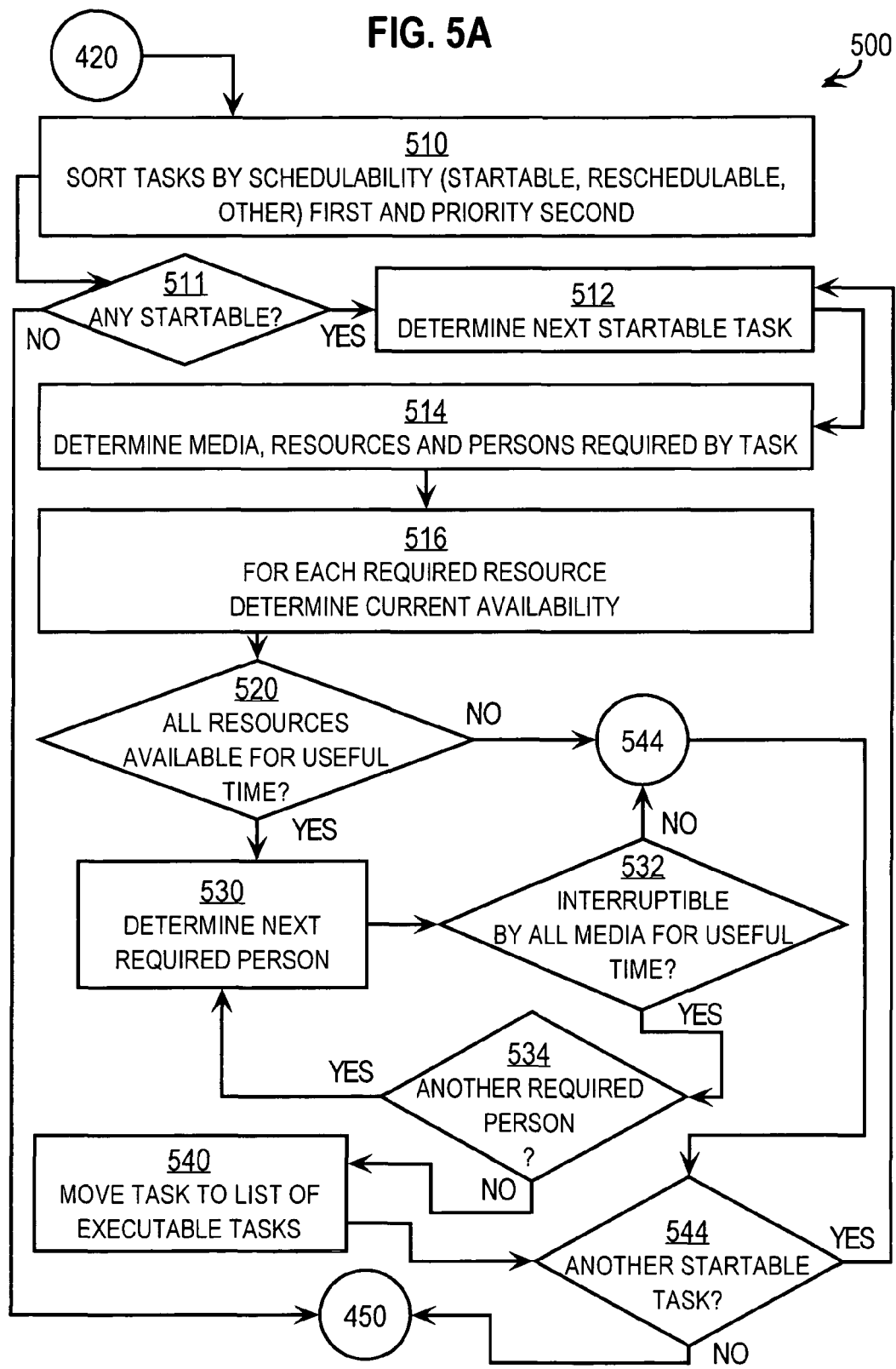

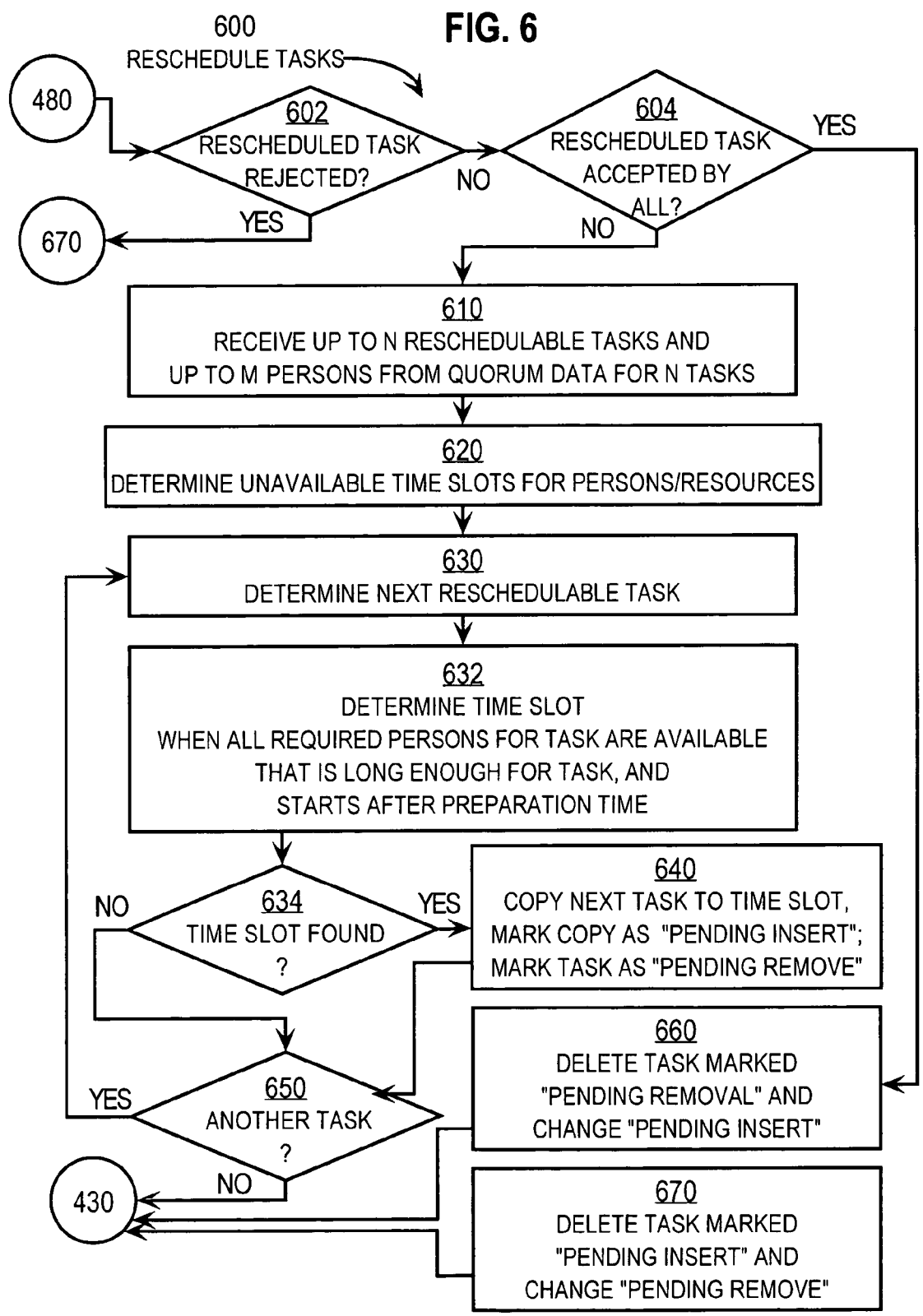

TECHNIQUES FOR TASK MANAGEMENT USING PRESENCE

BACKGROUND OF THE INVENTION

1. Field of the Invention

The present invention relates to scheduling tasks among multiple participants; and, in particular, to using current status data about a participant to schedule a future or executable task involving that participant.

2. Description of the Related Art

A number of software applications are available for scheduling collaborative tasks among busy members of an organization. For example, a commercial meeting scheduling application is available from Meeting Maker Inc. of Waltham, Mass., from Latitude of Santa Clara, Calif. (a subsidiary of Cisco Systems Inc. of San Jose, Calif.), LOTUS Notes from IBM Corporation of Armonk, N.Y., and Outlook from Microsoft Corporation of Redmond, Wash. For purposes of the following discussion, the term collaborative task includes any coming together of multiple parties for communication during overlapping time intervals, whether involving a meeting held in person, a task performed in person or involving remote communications, including communications of text, imagery, audio, video, multi-media, or data for network collaboration applications such as document preparation and games communications, or some combination of in-person meetings and remote communications.

Similarly, many different software applications are available for managing personal tasks, whether or not they involve collaborations with other persons. Many applications incorporate simple "task" or "to-do list" systems, which allow the user to enter a task description, be reminded of its deadlines, and track its completion. Microsoft Outlook allows task creation and tracking. In addition, tasks can be shared between multiple users, allowing any of those users to update the task status. There are also project management systems, such as Microsoft Project, which break complex tasks down into manageable personal tasks across a group of users and track the status of the tasks.

There has also been progress in integrating and sharing information among the various systems. For example IBM Workplace Collaboration Services, in conjunction with LOTUS Notes and Domino software, offers task management facilities. Microsoft Project can be integrated into Outlook now to provide real-time notification of task deadlines and task status.

All of these systems track several aspects of the task, but relatively few aspects of the person or persons performing the task. While suitable for many purposes, these systems suffer several disadvantages.

For example, many of these systems do not allow for persons to perform several tasks in the same time interval. Some tasks may require only partial attention, and leave a person able to perform some other tasks that require partial attention during overlapping time intervals. Some of these other tasks may be performed simultaneously, such as a routine physical activity and a passive mental activity. Some other tasks require specific communication mechanisms, like conference room resources or video facilities, other high bandwidth channels, a voice channel (e.g., cell phone), a text channel (e.g., instant message channel on a network connection or text messaging on a cell phone). Such tasks can only be performed when the communication mechanism is located with the person. Some tasks can be performed by the same person using one or more communications mechanisms for one task, and a different one or more communications mechanisms for a different task, during overlapping time intervals.

Another disadvantage is that some collaborative tasks are scheduled with best information available at the time of the scheduling. The actual current information may not agree with the earlier provided information. A person's ability to collaborate on a project changes, for example, because a communication mechanism not originally available to the person is made available. As another example, some persons accept tasks which they later do not perform and do not expect to perform or lose a communication mechanism to perform. Similarly, some persons accept meetings which they later do not attend and do not expect to attend. Many task and calendaring systems are unable to discover or make use of the actual current information in order to schedule, delay or initiate a personal or collaborative task. These systems tend not to inform one user of another's instant availability for purposes of a specific task, so collaborative tasks are not scheduled and executed opportunistically.

Based on the above, there is a clear need for a task management system that obtains and uses more comprehensive actual current information of participants involved in the tasks.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is flow diagram that illustrates a step of the method of FIG. 4A for determining currently executable tasks for the list of presence aware tasks, according to an embodiment;

FIG. 6 is a flow diagram that illustrates a step of the method of FIG. 4B for re-scheduling a task, according to an embodiment.

DETAILED DESCRIPTION

A method and apparatus are described for scheduling a task based on activity of a participant. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Illustrated embodiments of the present invention are described in the context of in-person meetings and text, voice, high priority voice, and video communications over a packet switched network (PSN) for one or more persons, but the invention is not limited to this context. In other embodiments, a person or other participant (such as an animal or a machine or device, such as a automaton) can attend zero or more in-person and on-line meetings, while performing zero or more individual tasks, or communicating with zero or more other persons or other participants using other kinds of media and other kinds of networks, such as circuit switched networks used by land line telephone networks, and hybrid networks often used today by cellular telephone networks, circuit-switched networks for video teleconferencing or networks of other architectures.

According to various illustrated embodiments, default task interruptibility or personal interruptibility data, or both, is used to schedule one or more future or currently executable tasks.

1.0 Network Overview

Figure 1:
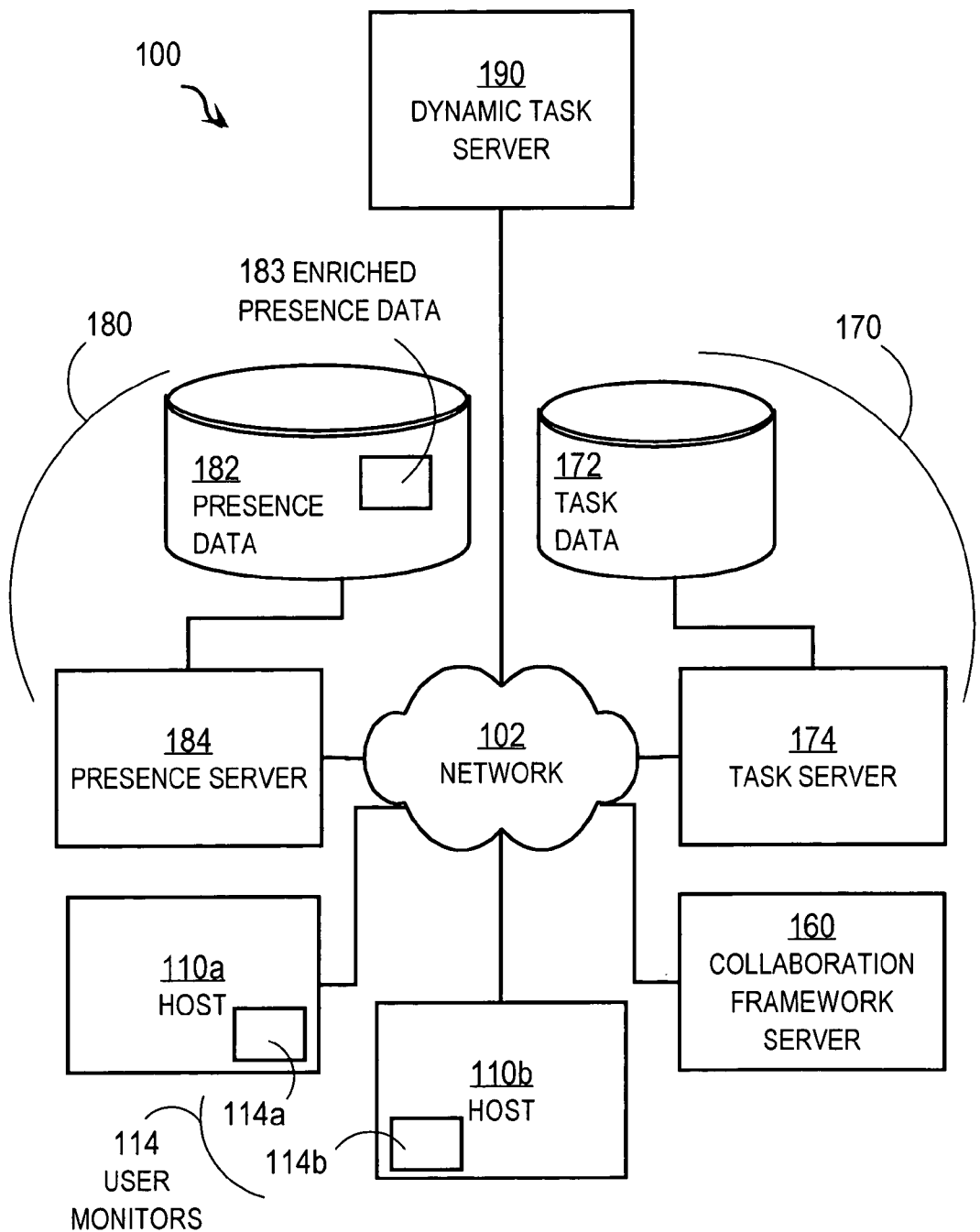
FIG. 1 is a block diagram that illustrates a network system for scheduling a task using actual status of a user of the system, according to an embodiment.

FIG. 1 is a block diagram that illustrates a network system 100 for scheduling a personal or collaborative task using actual status of a user of the system, according to an embodiment. System 100 includes network 102, hosts 110a, 110b (collectively referenced hereinafter as hosts 110), collaborative framework server 160, task system 170, presence system 180, and dynamic task server 190.

The client-server model of computer process interaction is widely known and used. According to the client-server model, a client process sends a message including a request to a server process, and the server process responds by providing a service. The server process may also return a message with a response to the client process. Often the client process and server process execute on different devices, called hosts, and communicate via a network using one or more protocols for network communications. The term "server" is conventionally used to refer to the process that provides the service, or the host device on which the process operates. Similarly, the term "client" is conventionally used to refer to the process that makes the request, or the host device on which the process operates. As used herein, the terms "client" and "server" refer to the processes, rather than the host devices, unless otherwise clear from the context. In addition, the process performed by a server can be broken up to run as multiple servers on multiple hosts (sometimes called tiers) for reasons that include reliability, scalability, and redundancy, among others.

The network 102 is any network that connects a variety of users of hosts, including, but not limited to, circuit-switched networks and packet-switched networks (PSNs). Example networks used as network 102 include, but are not limited to, local area networks (LANs), wireless networks, wide-area networks (WAN), the Internet (a public network of heterogeneous networks using the Internet Protocol, IP), and virtual private networks, alone or in any combination.

The hosts 110 are devices to which a population of potential participants in collaborative tasks (the "collaboration population"), or their human agents such as secretaries and assistants, have access. The hosts are connected to network 102. For the purposes of illustration, two hosts 110a, 110b are shown in FIG. 1. In other embodiments more or fewer hosts are connected to network 102. Any device that communicates through network 102 may be a host 110, including general purpose computers, personal digital assistants (PDAs), telephones, cell phones, and pagers, among other devices.

The system 100 includes a collaborative framework server 160, which controls the operation of collaboration infrastructure, such as conference call bridges and multimedia sessions between particular hosts. For purposes of illustration, server 160 is shown separate from hosts 110; but in some embodiments, server 160 resides in part or in whole on one or more of hosts 110. Furthermore, for purposes of illustration, one server 160 is shown; but in other embodiments, the control of collaboration infrastructure may be distributed over several servers like server 160. Any system known in the art may be used as collaboration framework server 170. In some embodiments, a collaboration framework server 160 is omitted.

The system 100 includes a task system 170, which includes a server 174 and task data 172 on one or more storage devices. The task server 174 controls the storage and retrieval of task data 172. For purposes of illustration, server 174 is shown separate from hosts 110; but in some embodiments, server 174 resides in part or in whole on one or more of hosts 110. Furthermore, for purposes of illustration, one server 174 is connected to one storage device with task data 172; but in other embodiments, the task data may be distributed over several data storage devices connected directly to one or more servers like server 174, or connected indirectly to one or more servers through network 102. Any system known in the art may be used as task data system 170, such as a calendar database system, an individual task manager, or a multi-person project system, or some combination. In various embodiments, system 100 includes more or fewer task data systems like system 170. In some embodiments, a task data system 170 is omitted.

The system 100 includes presence system 180, which includes a presence server 184 and presence data 182 on one or more storage devices. The server 184 controls the storage and retrieval of presence data 182. For purposes of illustration, server 184 is shown separate from hosts 110; but in some embodiments, server 184 resides in part or in whole on one or more of hosts 110. Furthermore, for purposes of illustration, one server 184 is connected to one storage device with presence data 182, but in other embodiments, the presence data may be distributed over several data storage devices connected directly to one or more servers like server 184, or connected indirectly to one or more servers through network 102. In some embodiments, a presence system 180 is omitted.

Presence data 182 is used in several extant and emerging applications. For example, in instant messaging applications, such as AOL Instant Messenger (AIM) from America Online of Dulles, Va. and PresenceWorks of PresenceWorks, Inc in Alexandria Va., presence data indicates the instantaneous information that someone is available online and reachable via instant messaging. Lotus Sametime from IBM of Armonk, N.Y. is an enterprise-based presence system that uses presence data 182.

More broadly, presence data indicates a dynamically changing set of channels, capabilities, characteristics, preferences and ability for persons or non-human participants to communicate and interact with each other at the current time. See for example at the website of the Internet Engineering Task Force (IETF) found at domain ietf.org, request for comments (RFC) 2778, the entire contents of which are hereby incorporated by reference as if fully set forth herein. Presence data includes such communicative states of availability as "online," "offline," or "online but not available."

Some applications have extended the concept of presence data to "rich presence" data with more availability information, including information that indicates, for a particular person, "try mobile phone first, then business line", "always send e-mail" or "unavailable for conference calls, but available for webcasts." In some applications, rich presence data may include physical location of the person such as "on travel in London," or "at home," or "in office" or "at company headquarters," as well as a network address. In some applications, rich presence data indicates people on the same (virtual) location like a web page or a shared document. In some applications, rich presence data indicates people who are within the same cell (the geographical area covered by a cellular phone antenna). In some applications, rich presence data indicates location of a person or facility based on a positioning system, such as the Global Positioning System (GPS) widely used in commerce and by the military. As used in the following, rich presence data indicates the geographic location or communicative state, or both, for a person at the current time and includes all sources of such information, no matter how precise or reliable, including a person's planned location or communicative state in a calendar database for the current time. A communication state includes information about the media available for communications, including voice, text, video, and application data, at various levels of priority, among others.

As described in more detail below for the illustrated embodiments, presence system 180 is modified to include additional rich presence data 183. As used herein, the additional rich presence data 183 includes one or more tasks being performed currently by a participant in association with an identifier for the participant, or information about how interruptible a participant is during a task, or some combination.

The system 100 includes a dynamic task server 190. The dynamic task server 190 determines current opportunities for scheduling, re-scheduling or executing an individual or collaborative task, or performing some combination of these functions. For purposes of illustration, dynamic task server 190 is shown separate from hosts 110 and servers 174, 184; but in some embodiments, dynamic task server 190 resides in part or in whole on one or more of hosts 110 or on a host with other depicted systems 170, 180 or as part of servers 160, 174, 184. In some embodiments, the dynamic task server 190 may be distributed over several hosts connected to network 102.

Hosts 110 include user monitors 114, which are processes that determine the current state of a person or other participant, including additional rich presence data about the person or participant, such as indications of what tasks a user at that end node is currently performing. The user monitors 114 report the additional rich presence information for use by the dynamic task server. User monitors 114a, 114b execute on hosts 110a, 110b, respectively. Although two user monitors 114 are depicted in FIG. 1 for purposes of illustration, in other embodiments more or fewer user monitors execute on more or fewer hosts accessed by participants in the collaboration population or their agents.

2.0 Data Structures

Figure 2A:
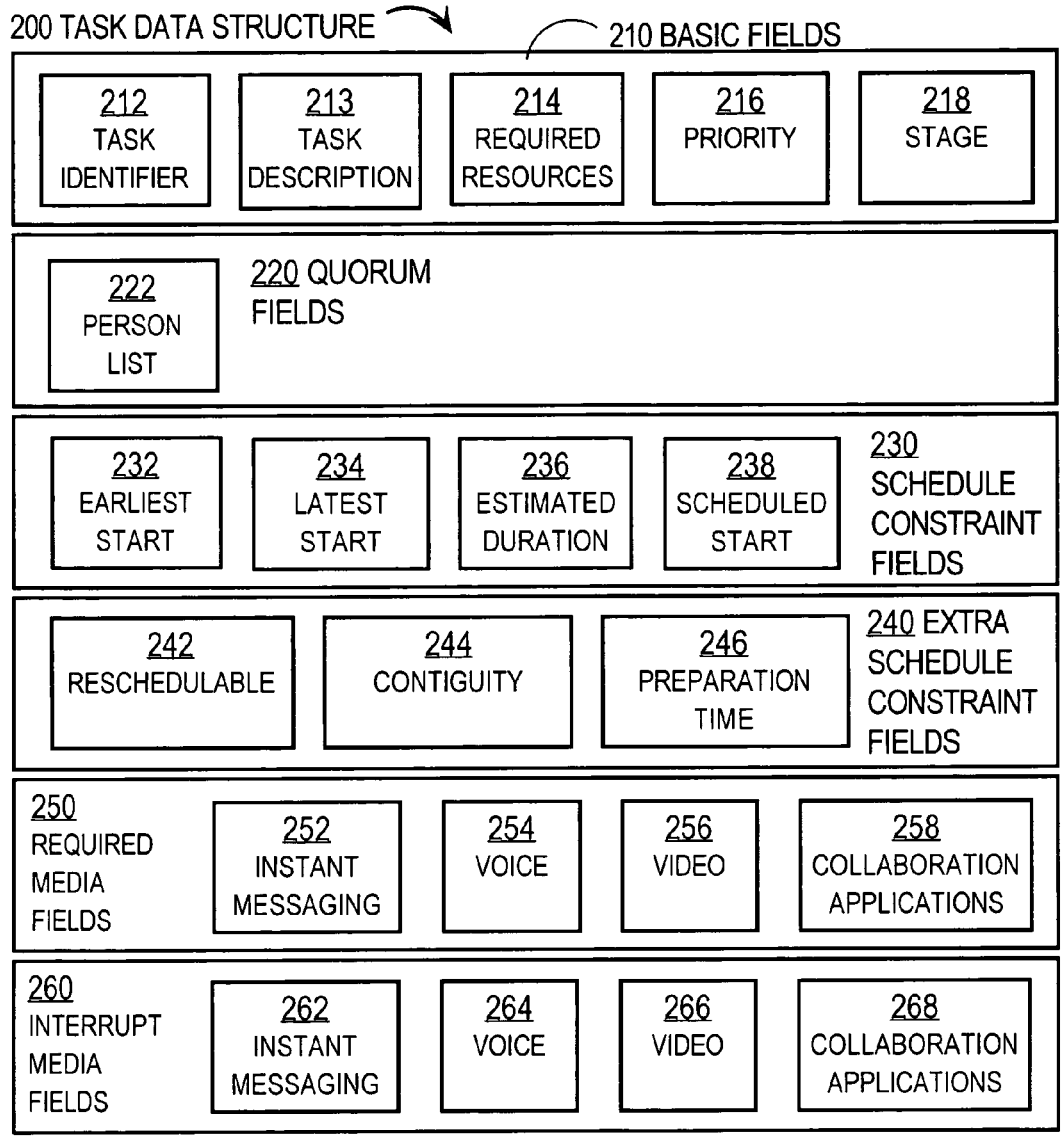
FIG. 2A is a block diagram that illustrates a task data structure that holds data for scheduling a task using actual status of a user, according to an embodiment.

FIG. 2A is a block diagram that illustrates a task data structure 200 that holds data for scheduling a task using actual status of a user, according to an embodiment. Although data fields for holding data are displayed in an integral data structure 200 in FIG. 2A for purposes of illustration, in other embodiments, one or more fields or portions of fields are held in any sequence in volatile or non-volatile memory in one or more different data structures in the same or different hosts and controlled by zero or more different data servers, such as one or more database servers.

Task data structure 200 includes basic task fields 210, quorum fields 220, schedule constraint fields 230, extra schedule constraint fields 240, required media fields 250, and interrupt media fields 260.

The basic task fields 210 include a task identifier field 212, task description field 213, required resources field 214, priority field 216 and stage field 218. In other embodiments more or fewer fields are included in the basic task fields 210. One or more of these fields are typically included in conventional task and project manager systems. The task identifier field 212 holds data that indicates a unique identifier for the task. The task description field 213 holds data that is used to describe the task to a human user.

The required resources field 214 holds data that indicates resources to be used to perform the task, such as conference room or other building facilities and equipment. In some embodiments, the resource field 214 includes a list of resource identifiers that are used as an index into another data structure or database with more information about the resource, such as name, location, devices and communications channels on devices belonging to that resource, and other details. In some embodiments at least some of this other information is included in resource field 214. In some embodiments, each resource in the resource list may be assigned a priority, indicating whether that resource is required, highly desirable, or optional to the performance or completion of the task.

The priority field 216 holds data that indicates a relative importance for performing this task compared to other tasks. All other factors being neutral, the higher priority task would be scheduled before a lower priority task. The stage field 218 holds data that indicates stage of execution for the task, e.g., proposed, approved, active, completed. In some embodiments described in more detail in a later section, the stage fields includes special values for re-scheduling a task, including re-scheduled for pending removal and re-scheduled for pending insertion.

The quorum fields 220 include one or more fields that describe the participants or groups of participants who are invited to or required to participate in a task. If only one participant is required, the task is an individual task. If more than one participant is required, the task is a collaborative task. In the illustrated embodiment, the quorum fields 220 include a person list field 222. In some embodiments, the person list field is a list of person identifiers that are used as an index into another data structure or database with more information about the person, such as name, base office location, devices and communications channels on devices belonging to that person, rank in the organization, and other details. In some embodiments, at least some of this other information is included in quorum fields 220. In some embodiments, each person on the person list may be assigned a priority, indicating whether that person is required, highly desirable, or optional to the performance or completion of the task.

The schedule constraints fields 230 include an earliest start field 232, a latest start field 234, an estimated duration field 236, and a scheduled start field. Some or all of these fields are used in conventional calendaring systems. The earliest start field 232 holds data that indicates a time before which the task may not start. The latest start field 232 holds data that indicates a time after which the task may not start. The estimated duration field 236 holds data that indicates an estimated duration of time to perform the task, once started. Clearly, a latest task completion date is related to the latest start time and the estimated duration, and in other embodiments the same information is expressed with a different combination of fields. The scheduled start field 238 holds data that indicates a start time for the task as scheduled, for example, on the calendars of one or more persons listed in the quorum fields. If the task start is not yet scheduled, the contents of the scheduled start field 238 so indicate, e.g., with a null value.

According to some embodiments of the invention, the task data structure 200 includes extra schedule constraint fields 240. The extra schedule constraint fields include a reschedulable field 242, a contiguity field 244, and a preparation time field 246. The use of data held in these fields is described in more detail with reference to the method of FIG. 3A, FIG. 3B, FIG. 4A, 4B, FIG. 5A, FIG. 5B, FIG. 5C or FIG. 6, or some combination.

The reschedulable field 242 holds data that indicates whether the task can be rescheduled at an earlier time, or a later time, or both, if a different time slot opens up. In some embodiments, this field is a simple on-or-off, yes-or-no, field, e.g., a one binary digit (bit) field. In some such embodiments, setting the reschedulable field 242 to the on or yes value will result in the dynamic task server "camping on" a task, which results in the task being actively monitored for changes; and thus allowing the task to move to an earlier time if all collaborators and resources become available. In some embodiments, this field is a four-valued field (e.g., a two bit field) to indicate one of four values: not re-schedulable, re-schedulable only to an earlier time; re-schedulable only to a later time, and re-schedulable either to an earlier or later time. In other embodiments other values are allowed in this field. For example, in some embodiments, two additional values are allowed to indicate 1] the task has been rescheduled for pending removal from the current scheduled start, or 2] the task has been rescheduled for pending insertion at the scheduled start.

The contiguity field 244 holds data that indicates whether the task should be performed in one or more contiguous sessions for the entire estimated duration, or can be broken up into short duration tasks (called "sessions" of "sub-tasks" below) that are separated by other tasks. The data in this field is a representation of whether the task should be continued from start until completion, or acceptably may be performed in part and then restarted at a later time to perform the remaining portion. As described below, in some embodiments, the value in the contiguity field 244 represents a minimum time duration for a useful performance of the task. A time slot shorter than this minimum time is not useful for this task. For a task that must be contiguous, e.g., continued till completion, the time duration in the contiguity field 244 equals or exceeds the duration indicated in the estimated duration field 236.

The preparation time field 246 holds data that indicates how much time should be allotted between the task start time and the time when a person is apprised of the task start time. This field is an indication of the amount of pre-notification time desired for a task. This attribute is especially useful if the task is marked as re-schedulable. If this value is non-zero, it implies that persons performing the task want enough time to accept the task and prepare for it that the task should not be re-scheduled to the current time. As such, a task with a pre-notification value should be scheduled for a time after the current time by at least the amount of time indicated in the preparation time field 246.

According to some embodiments of the invention, the task data structure 200 includes required media fields 250. These fields 250 indicate the types of communication media used to conduct the task. In the illustrated embodiment, the required media fields 250 include an instant messaging field 252, a voice field 254, a video field 256 and one or more other collaboration applications fields 258. In other embodiments more or fewer fields are included in the required media fields 250. In some embodiments, each of these fields is a simple on-or-off, yes-or-no, field, e.g., a one binary digit (bit) field. In some embodiments, each field is a larger field with multiple possible values that indicate a degree of use for the task or that identify the medium. The use of data held in these fields is described in more detail in the next section.

The instant messaging field 252 holds data that indicates whether instant messaging service is used to conduct the task. Similarly, the voice field 254 and video field 256 indicate whether voice or video service, respectively, is used to conduct the task. The other collaborative applications fields 258 indicate whether other communications services, such as collaborative documents, spreadsheets, games and other proprietary or open data formats, or voice or video of different priority are used as communications media to conduct the task. It is anticipated that new communications services and corresponding media types will become available in the future, and any or all of them may be included as fields in the other collaboration applications fields 258.

According to some embodiments of the invention, the task data structure 200 includes interrupt media fields 260. These fields 260 indicate the types of communication media through which a person performing the particular task may be engaged simultaneously to perform one or more additional tasks, while the particular task is being performed. These are default values (also called "template" values) for the task that can be superseded by individual participants, such as in decisions made during the task, as described in more detail below. In some embodiments, the interrupt media types are not properties of the task; in such embodiments, one, more or all of the interrupt media fields 260 are omitted. The use of data held in these fields is described in more detail in the next section. In some embodiments, each of these fields is a simple on-or-off, yes-or-no, field, e.g., a one binary digit (bit) field. In some embodiments, each field is a larger field with multiple possible values that indicate a degree of interruptibility.

In the illustrated embodiment, the interrupt media fields 260 include an instant messaging field 262, a voice field 264, a video field 266 and one or more other collaboration applications fields 268. In other embodiments more or fewer fields are included in the interrupt media fields 250. The instant messaging field 262 holds data that indicates whether participants can be interrupted by an instant messaging service while the task is being performed by default. Similarly, the voice field 264 and video field 266 indicate whether participants can be interrupted by voice or video service, respectively, by default while the task is performed. The other collaborative applications fields 268 indicate whether participants can be interrupted by default by other communications services, such as collaborative documents, spreadsheets, games and other proprietary or open data formats while the task is performed. In addition, collaborative applications that export the user interface of any general-purpose application may be included in the collaborative applications fields 268. In embodiments that allow task interruptibility, there will generally be an interrupt bit associated with every type of required media. It is anticipated that new communications services and corresponding media types will become available in the future, such as different priority levels for different media, and any or all of them may be included as fields in the other collaboration applications fields 268.

Thus the task data structure 200 holds data that represents that a task participant may perform the task using one or more communications media, while remaining available for interruptions on one or more communications media. In some embodiments, the other communications media are different from the communications media used to perform the task. In some embodiments, the other communications media include communications media used to perform the task.

Figure 2B:
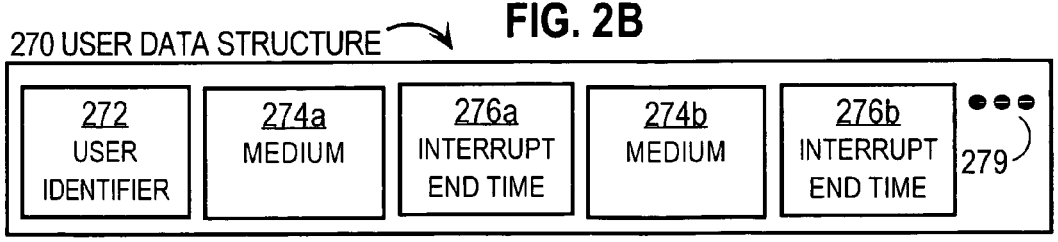
FIG. 2B is a block diagram that illustrates a user data structure that holds data for a participant performing one or more tasks, according to an embodiment.

FIG. 2B is a block diagram that illustrates a user (or participant) data structure 270 that holds data for a participant performing one or more tasks, according to an embodiment. User data structure 270 indicates the remaining availability and media to contact a person engaged in one or more current tasks. Although data fields for holding data are displayed in an integral data structure 270 in FIG. 2B for purposes of illustration, in other embodiments, one or more fields or portions of fields are held in any sequence in volatile or non-volatile memory in one or more different data structures in the same or different hosts and controlled by zero or more different data servers, such as one or more database servers or presence servers.

User data structure 270 includes a user identifier field 272, a first medium field 274a, a first interrupt end time field 276a, a second medium field 274b, a second interrupt end time field 276b, and additional fields indicated by ellipsis 279. In other embodiments more or fewer fields are included in the user data structure 270. The user identifier field 272 holds data that indicates a unique identifier for the person.

The medium fields 274a, 274b and others indicated by ellipsis 279, collectively referenced hereinafter as medium fields 274, each holds data that indicates a particular communications medium through which the user might be contacted while performing all current tasks, which are tasks that the person is currently performing.

The user data structure includes interrupt time end fields 276a, 276b and others indicated by ellipsis 279, collectively referenced hereinafter as interrupt end time fields 276. Each interrupt end time field, e.g., 276a, is associated with a particular medium field, e.g., 274a. Each interrupt end time field 276 holds data that indicates a particular time after which the person may not be interrupted by communications through the associated medium in order for the person to perform scheduled tasks at that time.

In the illustrated embodiments, data for the user data structure are collected by the user monitors 114 and forwarded (also called "published") to the dynamic task server 190, either directly or through presence system 180.

3.0 Method for Determining Currently Executable Tasks

According to some embodiments of the invention, a dynamic task server 190 obtains data about persons and tasks from task system 170 and presence system 180 and determines whether to present one or more personal or collaborative tasks that can be executed at the current time or before the end of a current task. In the illustrated embodiments, information about the current one or more tasks being performed by a person is determined by a user (or participant) monitor 114 on a host accessed by that participant or an agent of the participant. The user monitor 114 passes information about the state of the participant to the dynamic task server 190, either directly or through the presence system 180.

Current standards for presence servers, e.g. RFC2778, RFC2779, RFC3856, RFC3858, and RFC3994 for the Session Initiation Protocol (SIP, RFC3261) and RFC3920, RFC3921, RFC3922, and RFC3923 for an Extensible Messaging and Presence Protocol (XMPP), allow for extensible presence properties; and it is anticipated that in some embodiments, the status of users will be reported to the dynamic task server 190 using one or more of the extensible presence properties.

In the illustrated embodiments, most steps are performed by the dynamic task server 190 and a few steps are performed by user monitors 114. In these embodiments, each user monitor is a relatively thin client process. In other embodiments, however, more of the steps are performed by the user monitors 114, thus distributing some or all of the computational load from the dynamic task server 190 in the illustrated embodiment.

3.1 Method at User Monitor

Figure 3A:
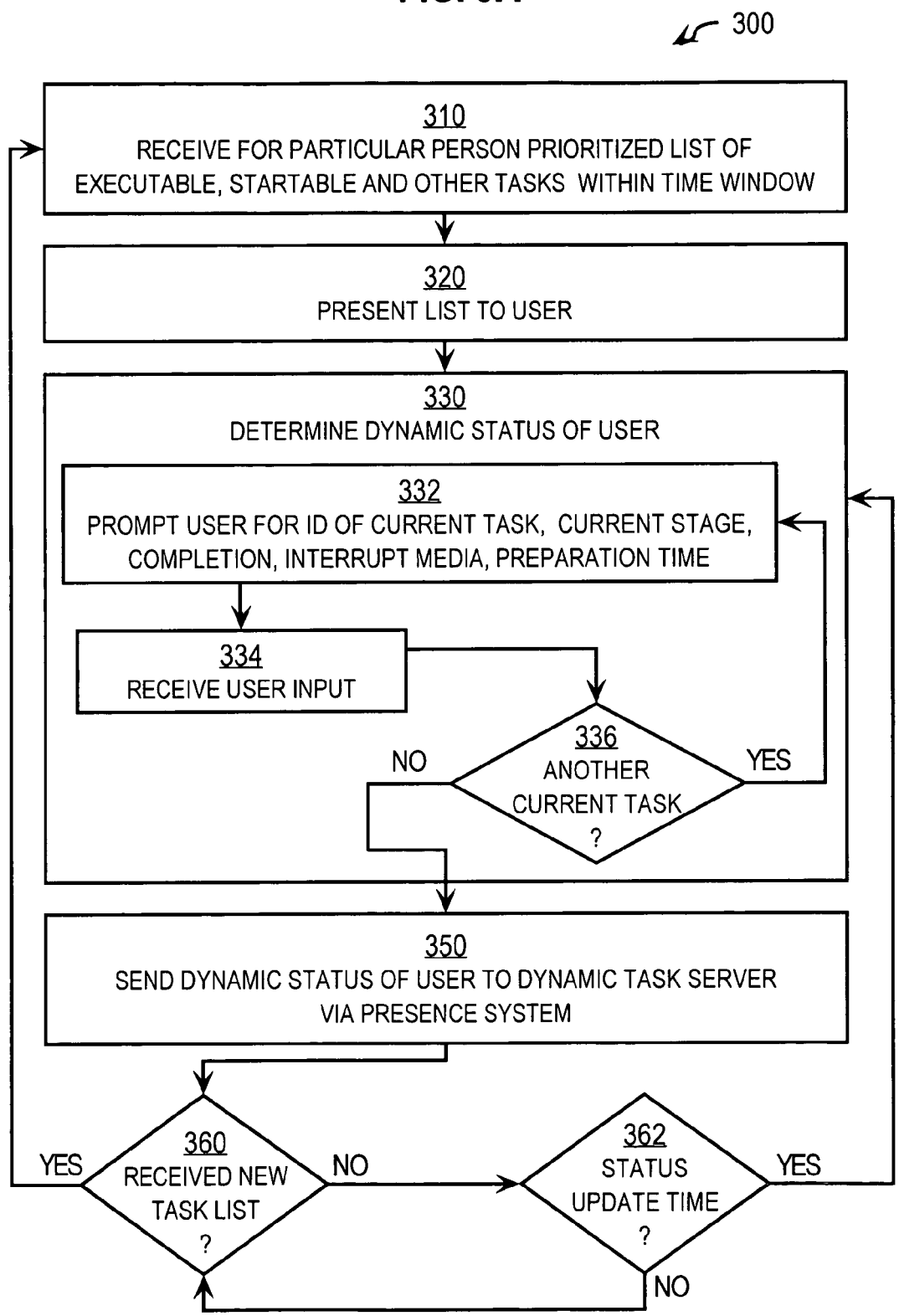
FIG. 3A is a flow diagram that illustrates a method at a user monitor for presenting a list of presence aware tasks, according to an embodiment.

FIG. 3A is a flow diagram that illustrates a method 300 at a user monitor for presenting a list of presence aware tasks, according to an embodiment. Although steps are shown in FIG. 3 and subsequent flow diagrams in a particular order for purposes of illustration, in other embodiments, steps may be performed in a different order, or overlap in time, or be omitted, or be changed in some combination of ways.

In step 310, task data is received at the user monitor (e.g., 114a) for a particular person or agent of the particular person who has access to the user monitor. For example, some or all the data in the data fields of data structure 200 for each task in which the user of host 110a is listed in the quorum fields 220 are received. Any method may be used to receive the task data, including retrieving the data from files on the host device (e.g., host 110a) for the user monitor (e.g., 114a), receiving the task data from a database on the host device or elsewhere on the network 102, in a message communicated through the network 102 from another process or server, such as dynamic task server 190, presence server 194 or task server 170, either in response to a prompt from the user monitor or unsolicited.

In the illustrated embodiment, the data received is sorted by priority within each of several categories. The categories are executable, startable and other. Startable tasks are tasks with an earliest start time before the current time and a latest start time after the current time. Executable tasks are startable tasks for which all required resources and all required persons are available (e.g., interruptible on the required media) at the current time for sufficient time to satisfy task contiguity conditions. Other tasks are tasks that are not yet startable, including recently completed tasks and tasks that are scheduled for a near future start but are not re-schedulable, or un-scheduled or re-schedulable tasks that involve a non-zero preparation time. Method 500, described below with reference to FIG. 5A illustrates how tasks are sorted and executable tasks identified at the dynamic task server 190 according to an embodiment. In various embodiments, tasks within a category are sorted and presented to the participant through a variety of methods, such as listing tasks from highest to lowest priority or from earliest scheduled to latest scheduled.

In step 320, the prioritized list is presented to the user by the user monitor (e.g., user monitor 114a). The list of executable tasks are essentially proposed tasks that can be executed (e.g., become active) at the current time. The user is free to select at least one of the executable tasks for immediate execution, but need not select any. In some embodiments, elements of the list are presented as icons on a graphical user interface which can be selected by the user at any time.

In step 330, the dynamic status of the participant represented by the user is determined. Any method may be used to determine the dynamic status of the participant. In some embodiments, the user monitor determines the current task being performed currently by a particular person automatically, at least in part, based on detecting a current process executing on a host device, or detecting user input actions at keyboard, pointing device or other input mechanism. For example, if a particular task is to work on a particular document, and the user monitor determines that the particular document is currently in use by a document editor, then the user monitor deduces automatically that the user associated with a participant is currently performing the particular task. In some embodiments, the user of the host is not the person performing the task, but an agent of that person, such as a secretary or associate. For simplicity of description in the following, the person performing a task is the same as the user of a device with a user monitor 114.

In an illustrated embodiment, step 330 includes steps 332, 334, 336. In step 332 the user monitor prompts the user to input particular information about a current task of one or more tasks indicated in the task data. For example, the user monitor prompts the user to indicate which of the tasks on the presence aware list the person who performs the task is currently performing. In step 334 the user's response is received and the status of the current task is determined based on that response. Steps 332 and 334 can overlap in time so that a sequence of prompts and responses occur to obtain the current status data for a current task. For example, after the user indicates a task on the list, the task ID or task data record 200 associated with that task, or both, are received by the user monitor. The user monitor then prompts the user for the current stage for the task (active, completed). In some embodiments, the user is prompted for an expected completion time for the task. In some embodiments, the default interrupt media through which the person performing a current task can perform other tasks concurrently with the current task, is determined from the task's default interrupt media fields 260. In some such embodiments, the user is prompted to make any desired modifications to the default interrupt media state for the personal interruptibility state. In some embodiments, the user is prompted for data about non-current tasks on the list. For example, in some embodiments, the user is prompted to select one of the executable tasks to start performing; and in some embodiments the user is prompted for a preparation time for re-schedulable and startable tasks. In some embodiments, step 334 is performed upon any asynchronous input by the user and does not depend on receiving a prompt in step 332 or a new task list in step 360 as shown in FIG. 3A. For example, step 334 is performed when a user just clicks on a graphical user interface (GUI) icon representing a task the user wants to execute.

In step 336, it is determined whether there is another current task to obtain status for. If so control passes back to step 332 to prompt the user for information about the next current task. If not, control passes to step 350.

In step 350, the status of the user is sent for the dynamic task server 190 to use in updating the presence aware list for this and other persons of the collaboration population. In the illustrated embodiment, the status data is sent as rich presence data through the presence system 180. In other embodiments, the data is sent directly to the dynamic task server directly without using the presence system 180. In one embodiment, the user monitor computes a presentity status and then exports that to a presence system 180. The presentity status is sufficiently rich to allow the dynamic task server 190 to determine:
the availability of the user for a task.
the user's level of interruptability.
the user's current media capabilities.
In some embodiments, the net interruptibility of the user for each medium across all current and some scheduled and unscheduled tasks is determined in step 350 and sent to the dynamic task manager, as described below in more detail with reference to FIG. 3B.

In some embodiments, other information is sent for the dynamic task server during step 350, such as the occurrence of an event affecting one or more scheduled tasks, as described in more detail below with reference to FIGS. 4A and FIG. 4B. For example, presentity status change in the user monitor would be sent during step 350. In some embodiments, the events that are presented to the dynamic task server are generated through some mechanism outside the user monitor.

Control then passes to steps 360, 362 to handle the next task data and to refresh the status data at appropriate times. In step 360, it is determined whether a new task list has been received, e.g., from the dynamic task server 190. If so, control passes to step 310 to receive that data, e.g., an updated presence aware list. In some embodiments, during step 360, the user monitor sleeps until any state change occurs on the user monitor, and control passes to step 310 upon the occurrence of some change in the state of the user or host of the user monitor. If a new task list is not received, and no other state change occurs, then control passes to step 362 to determine whether it is time to refresh the status data. Any method can be used to determine when to refresh the status data. In some embodiments, the status is updated when a new process is launched on the host for the user monitor. In some embodiments, the status is refreshed on regular intervals, e.g., every fifteen minutes. If it is time to refresh, control passes back to step 330 to determine the current status of the user. If not, control passes back to step 360 to wait for a new task list or other state change.

According to method 300, the user monitor 114 passes information about the state of the user to the dynamic task server 190, either directly or as rich presence data through the presence system 180.

Figure 3B:
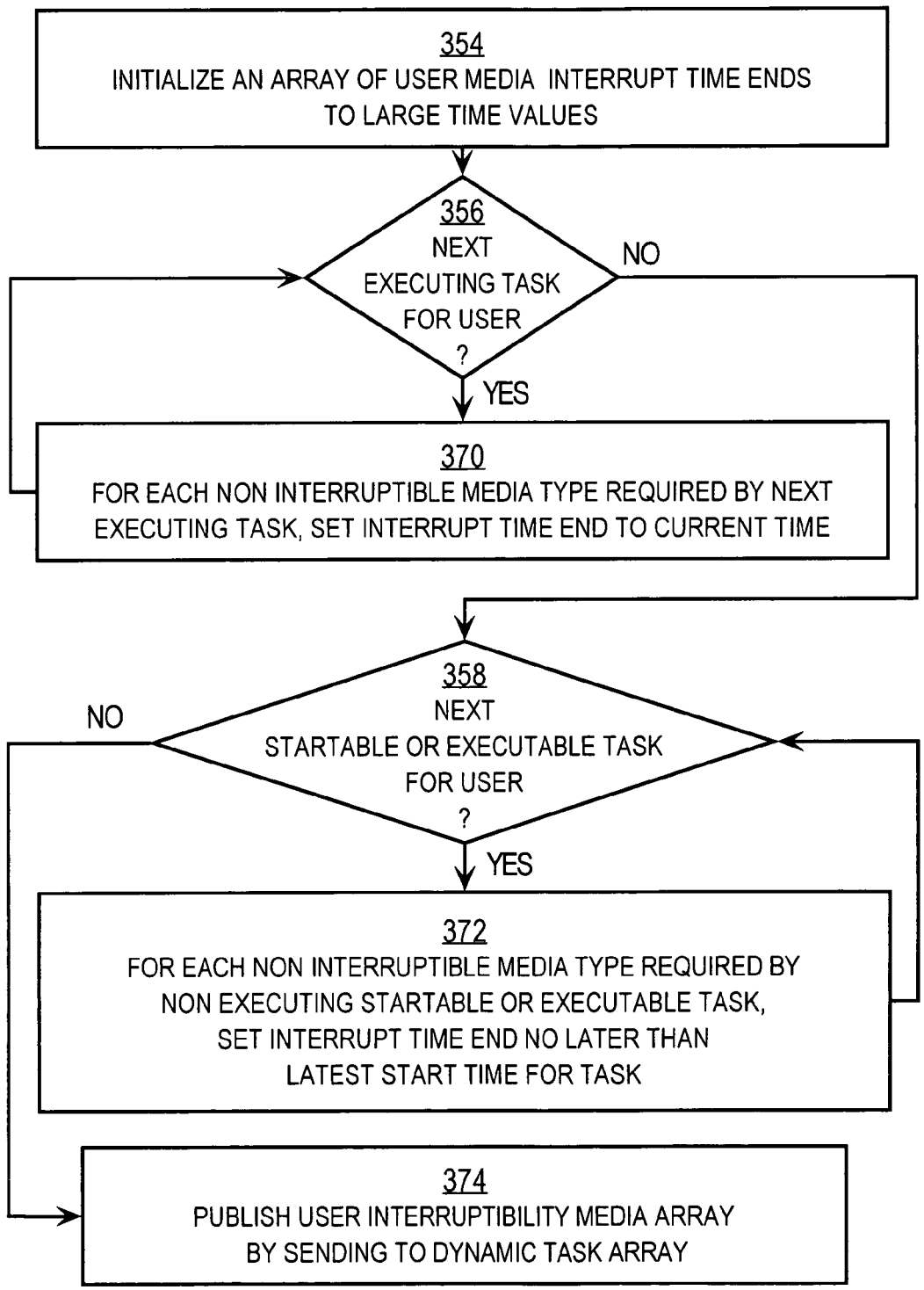
FIG. 3B is a flow diagram that illustrates a step of the method at a user monitor of FIG. 3A in more detail, according to an embodiment.

FIG. 3B is a flow diagram that illustrates step 350 of the method 300 at a user monitor in more detail, according to an embodiment 352. That is, method 352 is a particular embodiment of step 350 in which data for the user data structure is determined for a particular person and published for use in method 550 described in more detail below with reference to FIG. 5B.

In step 354 an array of user interrupt end times, e.g. for fields 276, is initialized with large time values, e.g., end times hundreds of days from the current time. Such large time values indicate that each medium is interruptible for a task of any duration, i.e., there is an open time slot using this medium for a very long time.

In step 356 it is determined whether the person for whom the data is collected is executing a current task not yet considered, called here a "next" executing task. If the person is currently not executing any tasks, the result of step 356 is a negative. If every task the person is currently executing has been considered already, the result of step 356 is also a negative.

If it is determined in step 356 that the person is executing a task not yet considered, control passes to step 370. In step 370, the interruptibility data for that next task and the interruptibility information provided by the user in step 334 is examined. For any medium required by the next task and not interruptible, the associated medium end time is set to the current time or an earlier time. Such a value indicates that the medium is not interruptible for a task of any duration. That is, the open time slot for this medium has ended. Control passes back to step 356 to determine if there is another task currently executing that has not yet been considered. When the loop represented by steps 356 and 370 ends, the only media with large time slots are those that are not required and those that are required but interruptible for all tasks currently being performed by the person. The user is interruptible on a medium either because all the tasks are interruptible as determined by the task data, or because the user has overridden the task data and deemed himself or herself interruptible on that medium.

If it is determined in step 356 that there is no other executing task to consider, the loop ends and control passes to step 358. In step 358 non-executing tasks are considered, such as tasks categorized as executable. In some embodiments only non-scheduled tasks are considered of the non-executing tasks. In some embodiments, all non-executing tasks out to some maximum time window, including scheduled and unscheduled and re-schedulable tasks, are considered. In step 358 it is determined whether the person for whom the data is collected is listed in the quorum fields in any non-executing task not yet considered, called here a "next" non-executing task.

If it is determined in step 358 that the person is listed in the quorum fields in any non-executing task not yet considered, control passes to step 372. In step 372, the interruptibility data for that next task and the interruptibility information provided by the user in step 334 is examined. For any medium required by the next task and not interruptible, the associated medium end time is set to the scheduled start time (e.g., from field 238), if the task is already scheduled, or to the latest start time (e.g., from field 234) for an unscheduled or re-schedulable task, provided the new end time is no later than an end time already associated with the medium. Such a value indicates that the medium is not interruptible for a task that endures past the earliest start of these other tasks. Control passes back to step 358 to determine if there is another non-executing task that has not yet been considered. When the loop represented by steps 358 and 372 ends, the only media with large time slots are those that are not required and those that are required but interruptible for all tasks that involve that person. Non-executing tasks that are not interruptible for some media, show finite times as open slots that are less than the very large time.

If it is determined in step 358 that there is no other non-executing task to consider, the loop ends and control passes to step 374. In step 374 the personal interruptibility data, e.g. in user data structure 270, is published by sending rich presence data to the presence server or by sending a message to the dynamic task server. The published personal interruptibility data is used to reschedule one or more tasks, as described in more detail below with reference to FIG. 5A and FIG. 5B and FIG. 5C and FIG. 6.

3.2 Method at Task Manager

Figure 4A:
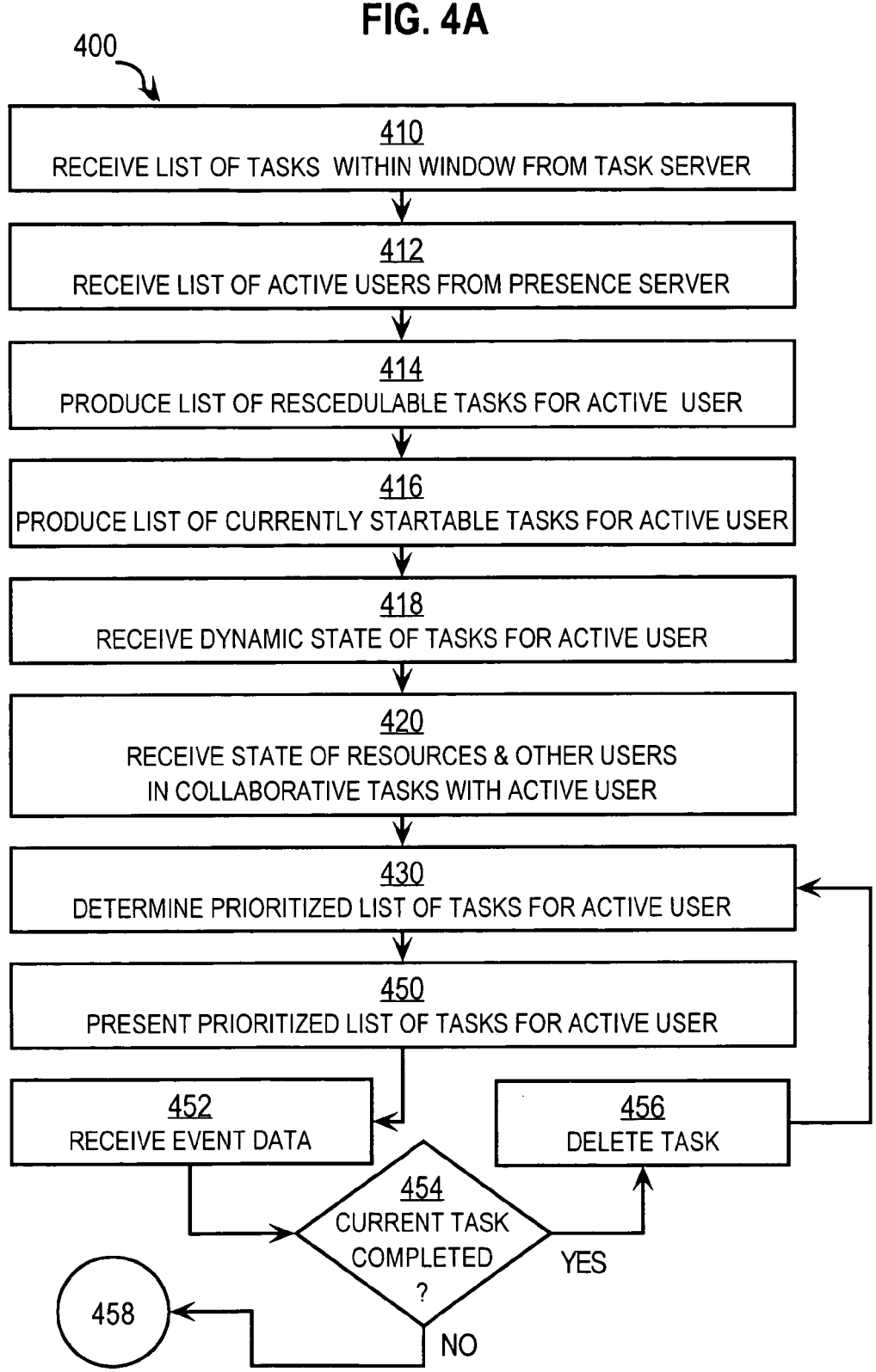
FIG. 4A and FIG. 4B constitute a flow diagram that illustrates a method at a dynamic task server for presenting a list of presence aware tasks to a user, according to an embodiment.
Figure 4B:
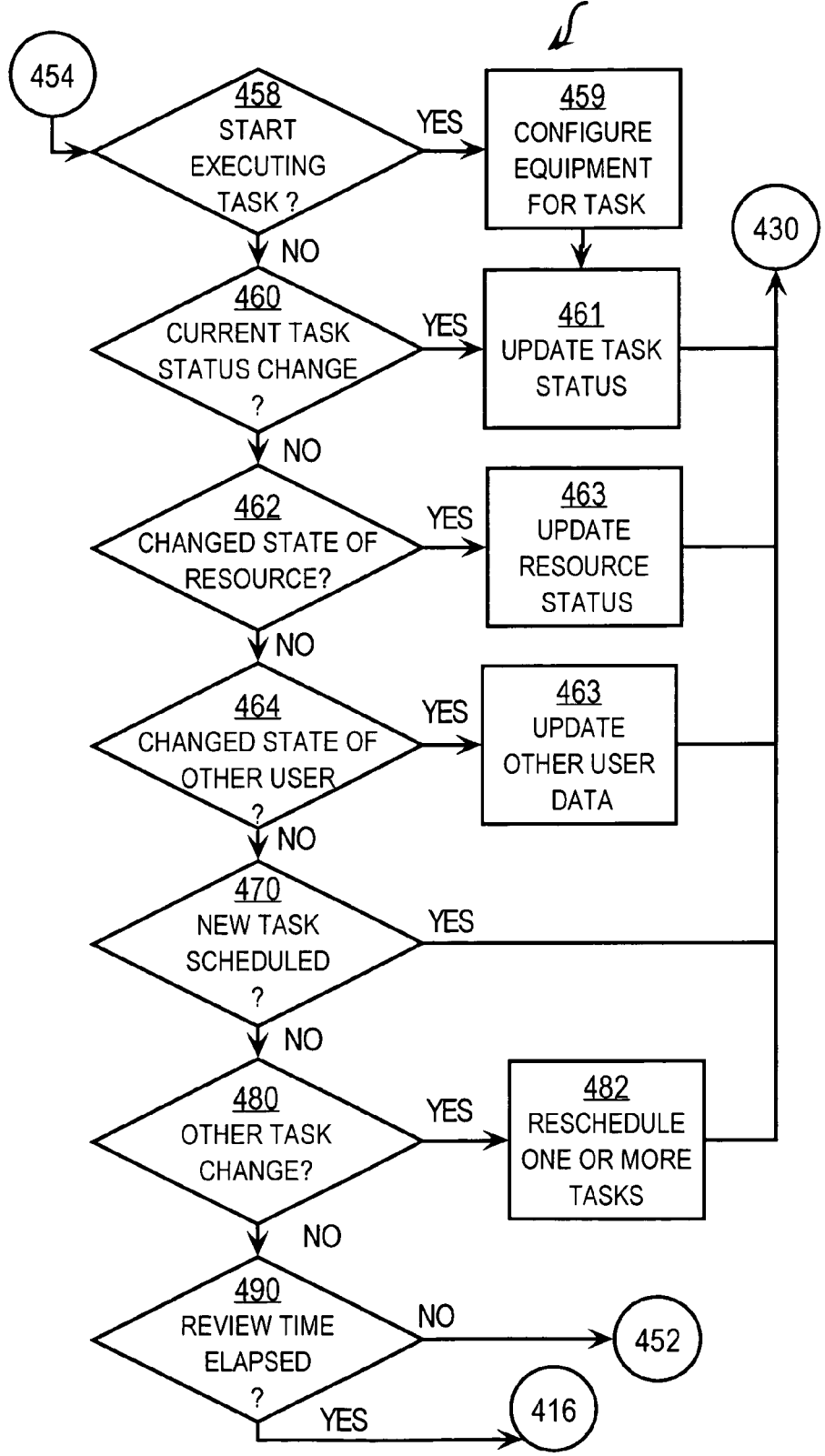

FIG. 4A and FIG. 4B constitute a flow diagram that illustrates a method 400 for determining a user presence aware list of tasks at a dynamic task server 190, according to an embodiment. Method 400 is a process thread for one participant. In a typical embodiment, method 400 is repeated for each participant in a collaborative population, either in series by one process or in parallel by multiple independent processes running on one host or several hosts, such as hosts for user monitors 114. The user presence aware list and user response is used to schedule one or more tasks for a current time or a later time.

In step 410, a list of tasks is received. Any method may be used to receive the data. In the illustrated embodiment, the data is received from task server 174. In the illustrated embodiment, the information for each task is represented by the fields in data structure 200, described above. To avoid an open ended list extending decades into the future, the list of tasks is limited in some way, either to a specified number of tasks (e.g., 100 tasks) or a temporal window of interest (e.g., one week or one month). Conventional task systems 170 do not collect some of the data in data structure 200, thus in embodiments that use the unconventional fields, e.g., the extra schedule constraint fields 240 or the required media fields 250 or the interrupt media fields 260, the dynamic task server 190 during step 410 obtains this unconventional information. Any method may be used to obtain the unconventional information, including prompts by the user monitors 114, sending web forms to a user of the task system 170 to prompt that user to input additional information, using default or template information provisioned on the dynamic task server, or any combination of the above methods.

In step 412, the dynamic task server 190 receives a list of active users. Any method may be used to receive the data. In the illustrated embodiment, the data is received from presence server 184, as presentity data. In some embodiments, to limit the presence data to a manageable scope, only presence data from presentities that are listed as collaborators in the quorum fields of one or more tasks in the task list are collected. For example, during step 412, the dynamic task server 190 constructs a list of all participants listed in the quorum fields of the tasks collected in step 410, then makes requests to the presence server to "watch" those participants. The "watch" action is a presence service term well known in the art. The watch results in the dynamic task server 190 receiving an initial presentity status plus any subsequent change in presentity status for those participants. In some embodiments, the list of watched participants is further consolidated across the task lists for all participants serviced by the dynamic task server 190.

In step 414 a list of the re-schedulable tasks for one of the active users is determined based on the data received in steps 410, 412. For example, a list of re-schedulable tasks is determined for active user A who has access to host 110a, by finding all tasks that list user A in the quorum fields 220 and indicate the task is re-schedulable in field 242. In some embodiments, step 414 includes obtaining one or more un-scheduled tasks.

In step 416 a list of startable tasks for one of the active users is determined based on the data received in steps 410, 412. For example, a list of startable tasks is determined for active user A who has access to host 110a, by finding all tasks that list user A in the quorum fields 220 and indicate that the current time falls in a range of times that start at the time indicated in the earliest start field 232 and ends at the time indicated in the latest start field 234.

In step 418, the dynamic task server 190 receives data that indicates the dynamic state of an active user A, e.g., based on input from user A. Any method may be used to receive the data. In the illustrated embodiment, the data is received from presence server 184 in the rich presence data 183, e.g., as presentity status. In the illustrated embodiment, the rich presence data 183 includes data that indicates the task ID of each of the one or more tasks being performed by active user A, the current stage of each of those tasks, and the media through which user A can be interrupted from all tasks to engage in another task based on user data structure 270.

In step 420, a list of all users in the quorum fields of any of the tasks retrieved during step 418 is compiled, and the presence server is accessed to determine the state of all of those users. Some embodiments compile presence information for resources other than just users. For example, resources like conference rooms and multimedia equipment may also have a presence status associated with them. In some embodiments, the dynamic task server maintains the state of the various users and resources in the system 100, and the presence server is omitted.

In step 430, a prioritized list of tasks within each of several categories is determined; this list is called the presence aware list of tasks. The categories are executable, startable and other, as described above for step 310. The executable tasks are those tasks that can be scheduled and executed currently, if accepted by the participants. A particular embodiment of step 430 is described in more detail below with reference to FIG. 5A and FIG. 5B and another embodiment is described with reference to FIG. 5C.

In step 450, the presence aware list is presented to the participant. For example, the presence aware list is sent as task data to the user monitor for active user A, which receives the list in step 310 and presents it to user A in step 320.

In step 452, event data is received at the dynamic task manager 190, which indicates some event that results in further action by the dynamic task manager. Any method may be used to receive the event data. In some embodiments, the event data is received from a conventional task manager that has updated one or more fields in a task data structure. In some embodiments, some of the event data is received form the user monitor 114. In the illustrated embodiment, it is assumed that changes by a user of a task manger are reported to the dynamic task manger which then updates one or more fields in task data structure 200 and then re-determines one or more lists of tasks to present to one or more users based on the change. The next action depends on the event, as depicted in FIG. 4A and 4B by branch points represented by diamonds. Any method of programming the branch points may be used, such as SELECT-CASE statements or IF-THEN statements.

In step 454, it is determined whether a task on the list has been completed, and thus should be removed from the list of tasks to be performed. If it is determined that a particular task on the list has been completed, control passes to step 456. In step 456, the particular task is deleted from the list and any remaining persons and resources committed to the task are freed for use in other tasks. Control passes back to step 430 to determine a new list, e.g., to determine executable tasks and re-sort the list without the particular task. In other embodiments, control passes to another step that involves re-computing only a portion of the list.

If it is determined in step 454 that the event data does not indicate a particular task on the list has been completed, control passes to step 458. Steps 458 and following steps are described with reference to FIG. 4B.

In step 458, it is determined whether an executable task has been accepted by a user and has begun execution. If so, control passes to step 459 to configure any resources to support the task. For example, the collaboration framework server is invoked to configure a teleconferencing bridge to connect the persons listed in the quorum fields 220 for the task. As another example, a multimedia Session Initiation Protocol (SIP) is set up among applications on the devices used by the persons listed in the quorum fields 220 for the task. In some embodiments, there is no equipment to configure, and step 459 is omitted. Any method known in the art to configure any resource to support the task may be utilized. Control then passes to step 461 to update the status of the task in the task data. For example, stage field 218, scheduled start field 238, and reschedulable field 242 in task data structure 200 are updated, during step 461. The task is removed from the startable and executable lists. Control passes back to step 430 to determine a new list, e.g., to determine executable tasks and re-sort the list without the particular task among the executable or startable tasks. If it is determined in step 458 that a task has not begun execution, control passes to step 460.

In step 460, it is determined whether there is a change in the status of a current task being performed by the active user, e.g., active user A. If so, control passes to step 461 to update the task status. Control then passes to step 430 to determine a new presence aware list based on the change.

If it is determined during step 460 that there is not a change in the status of a current task being performed by the active user, then control passes to step 462. In step 462, it is determined whether there is a change in the state of a resource used by a task. If so, control passes to step 463 to update the resource status. For example, if the event data indicates that a needed conference room formerly available for a particular executable task is no longer available, then control passes to step 463 to change the availability of the resource. Control then passes to step 430 to determine a new presence aware list based on the change.

If it is determined during step 462 that there is not a change in the state of a resource used by a task, then control passes to step 464. In step 464, it is determined whether there is a change in the state of another participant involved in the task. If so, control passes to step 463 to update the data concerning that participant. For example, if the event data indicates that a participant formerly unavailable for a particular startable task is now interruptible by instant messaging, then control passes to step 463 to record this change in the participant interruptibility data, e.g., in participant data structure 270 for that participant. Control then passes to step 430 to determine a new presence aware list based on the change.

If it is determined during step 464 that there is not a change in the state of another participant involved in the task, then control passes to step 470. In step 470, it is determined whether there is new task added to those within the window being considered. If so, control passes to step 430 to determine executable tasks and re-sort the list of tasks based on this change.

If it is determined during step 470 that there is not a new task added to the list, then control passes to step 480. In step 480, it is determined whether there is some other change to a task. For example, such changes result from a modification of a task's stage field 218, quorum fields 220, schedule constraint fields 230, extra schedule constraint fields 240, required media fields 250, or interrupt media fields 260. Such changes occur, for example, when one or more tasks are scheduled. This scheduling operation involves setting the schedule constraint fields 230 and extra schedule constraint fields 240. In some embodiments, setting these fields may occur in conjunction with accessing a calendaring system through the task server 174. If so, control passes to step 482 to reschedule one or more tasks. An embodiment of step 482 is described in more detail below with reference to FIG. 6. Control then passes to step 430 to determine executable tasks and re-sort the list of tasks based on this changes.

If it is determined in step 480 that there is no other change to a task, then control passes to step 490. In step 490, it is determined whether a review time increment has elapsed. If not, control passes back to step 452 to await the next event. If so, control passes to step 416 to update the window with more tasks that have become startable. A finite review time increment is used so that the processing effort of sorting the tasks in step 430 does not become excessive. Any method may be used to determine whether a review time increment has elapsed. For example, a review event generator is included in step 452 in some embodiments that issues a review event after a certain number of processor clock cycles. In some embodiments, step 490 is a background task that counts clock cycles and invokes step 416 when a certain number of clock cycles is reached.

In various embodiments, step 490 includes additional checks to determine whether sufficient time has passed to review other tasks; and, if so, control is passed back to step 410 or step 412 or step 418 or step 420 before returning to step 430.

In some embodiments, the steps of method 400 are performed in several different processes running in parallel, rather than one process running in series, as shown in FIG. 4A and FIG. 4B. In some embodiments, one or more error recovery steps are added to method 400. For example, if all the required participants don't accept the dialout from the conference service during step 459, then an error recovery process of some type is initiated. For example, the task is not started, its status is changed back to pending, and an event indicating this change is promulgated.

In some embodiments, steps of method 400 are distributed between the dynamic task server 190 and user monitors 114. For example, the dynamic task server 190 performs steps that involve data about multiple persons of the collaboration population, but steps that concern only one person may be performed by the user monitor on the device associated with that person. Thus, in some embodiments, both step 450 and some or all of step 430 are performed by a user monitor for the active user.

FIG. 5A is a flow diagram that illustrates a step 430 of the method 400 of FIG. 3A for determining currently executable tasks and sorting the presence aware list, according to an embodiment 500. The steps of method 500 constitute a particular embodiment of step 430; in other embodiments of step 430 more, fewer or other steps, or some combination of changes, are used.

In step 510, the tasks in the list produced during step 410 are sorted first by category of schedulability (e.g., startable, re-schedulable, other) and then by priority. Thus all startable tasks are listed before all re-schedulable tasks that are not startable, which are listed before all other tasks. A task is startable if its earliest start time (e.g., as expressed by data stored in field 232) is at or before the current time, and its latest start time (e.g., as expressed in field 234) is at or after the current time. Within each category, for the illustrated embodiment, the tasks are listed in priority order, from highest priority to lowest priority. In some embodiments, the sorting considers the more desirable or urgent tasks. For example, factors considered during this sorting include task priority, how close the task is to its latest start date and time, input from the user monitor indicating that the user would like to perform a task soon, among others.

In some embodiments of step 510, an empty "executable task list" is initialized. This list is prepared to contain any tasks that are determined to be executable at the current time, as a result of processing that occurs in steps 512 through 544. These steps constitute a loop that considers each startable task in turn and determines whether that task is executable or note.

In step 511 it is determined whether there is any startable task. If there is no startable task, then the loop is skipped and method 500 is complete. Control then passes to step 450 as depicted in FIG. 4A. Referring again to FIG. 5A, if it is determined in step 511 that there is at least one startable task, control passes to step 512.

In step 512, the next startable task on the list is selected. In step 514, the media, resources and persons indicated for use with the next startable task are identified based on the task data, e.g., on the quorum fields 220 and resource fields 214 in data structure 200.

In step 516 the availability of one or more of the resources are determined. Control then passes to step 520. In step 520, it is determined whether all resources are available for a time useful for performing the task. Any method may be used in steps 516, 520. For example, as soon as one required resource is determined to be unavailable, then all further checking ceases. If it is determined in step 520 that not all resources are available, control passes to step 544. Note that this has the effect of leaving the current task in an un-executable state. An embodiment of step 520 that considers the length of time and the contiguity requirements of a task is described in more detail below with reference to FIG. 5B.

If it is determined in step 520 that all resources are available for a useful time, then control passes to step 530 to determine the next participant involved in the task. The participants can be determined in any order. In some embodiments, the participants are ranked and considered in order of most important for the task to least important. In the illustrated embodiment, only required participants are considered. Control then passes to step 532.

In step 532, it is determined whether the next participant is currently executing a task or tasks that are all interruptible for a useful time by all media required for use by the task selected in step 512. This determination can be made using any method. In the illustrated embodiment, rich presence data is retrieved from the presence server 184 indicating what media are interruptible. If the participant is not interruptible, control passes to step 544, leaving the task under consideration in an un-executable state. If it is determined in step 532, that this participant can be interrupted by the media for the task, then control passes to step 534. Because this step involves obtaining data for multiple participants when the task is collaborative, this step is more appropriately performed by the dynamic task server 190 than by a user monitor 114 for collaborative tasks. An embodiment of step 532 that considers the length of time and the contiguity requirements of a task is described in more detail below with reference to FIG. 5B In step 534, it is determined whether there is another participant involved in the task. If so, control passes back to step 530 to determine the next person. If not, control passes to step 540.

In step 540, the task is deemed to be executable and is therefore moved onto the end of the executable task list. This list includes tasks for which all resources and participants required are interruptible with the media needed for the task.

In some embodiments, steps 520 and 532 consider whether the task can be broken into multiple short duration tasks, called short "sessions" or short tasks, to fit in the time slots available for the persons and resources desired to perform the task. As described herein, the first session is considered a modified (shorter duration) version of the task, and subsequent sessions are considered new tasks. Thus a task that is broken into two short tasks results in one new task.

Figure 5B:
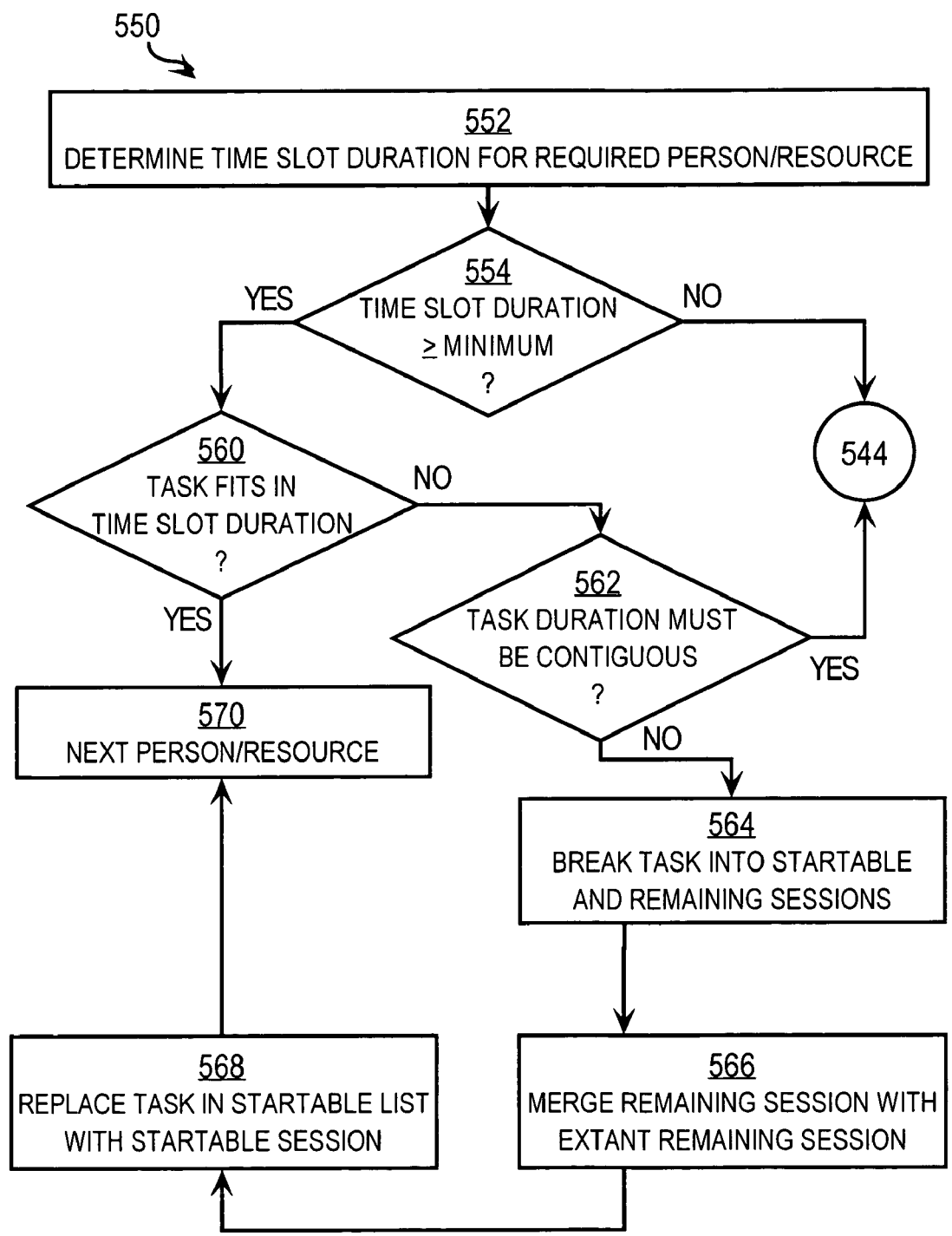
FIG. 5B is flow diagram that illustrates steps of the method of FIG. 5A for determining time slot availability for startable tasks, according to an embodiment.

FIG. 5B is flow diagram that illustrates a step of the method of FIG. 5A for determining available time slots for scheduling tasks, according to an embodiment. The steps of method 550 constitute a particular embodiment of step 532 or steps 516 and 520. In other embodiments of these steps, more, fewer or other steps, or some combination of changes, are used. In method 550, an individual resource or participant is considered and determined to be available for either the original task or a modified task that is the first session of multiple sessions derived from the original task. In the illustrated embodiment, this method 550 uses the value of the contiguity fields 244 of the task data structure 200. For simplicity, the operation of method 550 is described for a required participant; but the method also applies to a required resource, such as a conference room with multimedia teleconferencing equipment. The shortest of the longest interruptible durations of all the involved persons is the time slot duration which is available for performing this executable task. Method 550 shows the steps involved for each participant or resource. Because this step involves obtaining data from a calendaring system for multiple participants when the task is collaborative, this step is more appropriately performed by the dynamic task server 190 than by a user monitor 114 for collaborative tasks.

In step 552, the longest duration of the time for which the participant (or resource) is interruptible is determined for the participant (or resource) under consideration. This time is called herein the time slot and is expressed by the end time of the time slot. In some embodiments, the information is received from enhanced presence data or from a calendaring system. In the illustrated embodiment, this information is obtained for a participant in the user data structure 270, described above. This value is expected to vary from one participant to the next. If multiple media are required for the task, the time slot is the shortest (earliest end time) of the time slots for the required media.

In step 554, it is determined whether the time slot duration is greater than a minimum useful time slot. The time slot duration is determined by the difference between the shortest end time for the required media and the current time. The minimum can be determined in any manner. In some embodiments, the minimum time is a default value, e.g., 15 minutes. In some embodiments, the contiguity fields 244 include a value that indicates the minimum useful time slot duration. A task that must be completed in its entirety without breaks would be indicated by a minimum useful time slot duration value in the contiguity field 244 that equals the estimated duration of the task in the estimated duration field 236. A task that can be broken into multiple sessions would be indicated by a minimum useful time slot duration value in the contiguity field 244 that is less than the estimated duration of the task in the estimated duration field 236. If it is determined in step 554 that the time slot duration is not greater than or equal to the minimum, then control passes to step 544, as shown in FIG. 5A, to be left in a non-executable state. If it is determined in step 554 that the time slot duration is greater than or equal to the minimum, then control passes to step 560. In some embodiments step 554 is omitted and control passes directly to step 560.

In step 560, it is determined whether the task under consideration fits in the time slot duration. In the illustrated embodiment, this test is based on the contents of the estimated task duration field 236. If the task under consideration fits, the task is still potentially executable and control passes to step 569 to leave the task in the startable list and proceed to the next participant, e.g., step 530 (or resource, e.g., steps 516, 520). If it is determined that the task under consideration does not fit (e.g., can not be completed) in the time slot duration, then control passes to step 562 and following steps to see if the task can be broken up into multiple session to fit in the available time slot duration.

In step 562, it is determined whether the task must be completed in contiguous sessions or can be broken up into two or more sessions that are not contiguous. In the illustrated embodiment, this determination is based on the contents of the contiguity field 244 in the task data structure 200 maintained by the dynamic task server 190. For example, if the value in the contiguity field 244 is less than the value in the estimated duration field 238, then the task can be broken into multiple sessions.

If it is determined in step 562 that the task duration must be contiguous, then control passes to step 544 to be left in a non-executable state, as shown in FIG. 5A.

If it is determined in step 562 that the task duration need not be contiguous but can be broken up into multiple sessions separated by other tasks, then control passes to step 564. In step 564, the task is broken up into an executable session that fits in the time slot duration determined in step 552 and a remaining session. Control then passes to step 566.

In step 566 the remaining session is merged with an extant remaining session for this task if any. That is, if the task had been broken up into multiple sessions based on a previous pass through method 550, the remaining session is merged with that remaining session from the previous pass. In the illustrated embodiment, a session is merged by appropriately modifying the contents of the task data structure. For example, the estimated duration is lengthened by the duration of the new remaining session, and the latest start time is move earlier by that same amount. If there is no extant remaining session, the session generated in step 564 becomes the extant remaining session. Control then passes to step 568.

In step 568, the task in the startable list and still potentially executable is replaced by the modified task for the first session with the shorter duration. Other fields in the task data structure are modified as appropriate. Control then passes to step 569, described above.

Figure 5C:
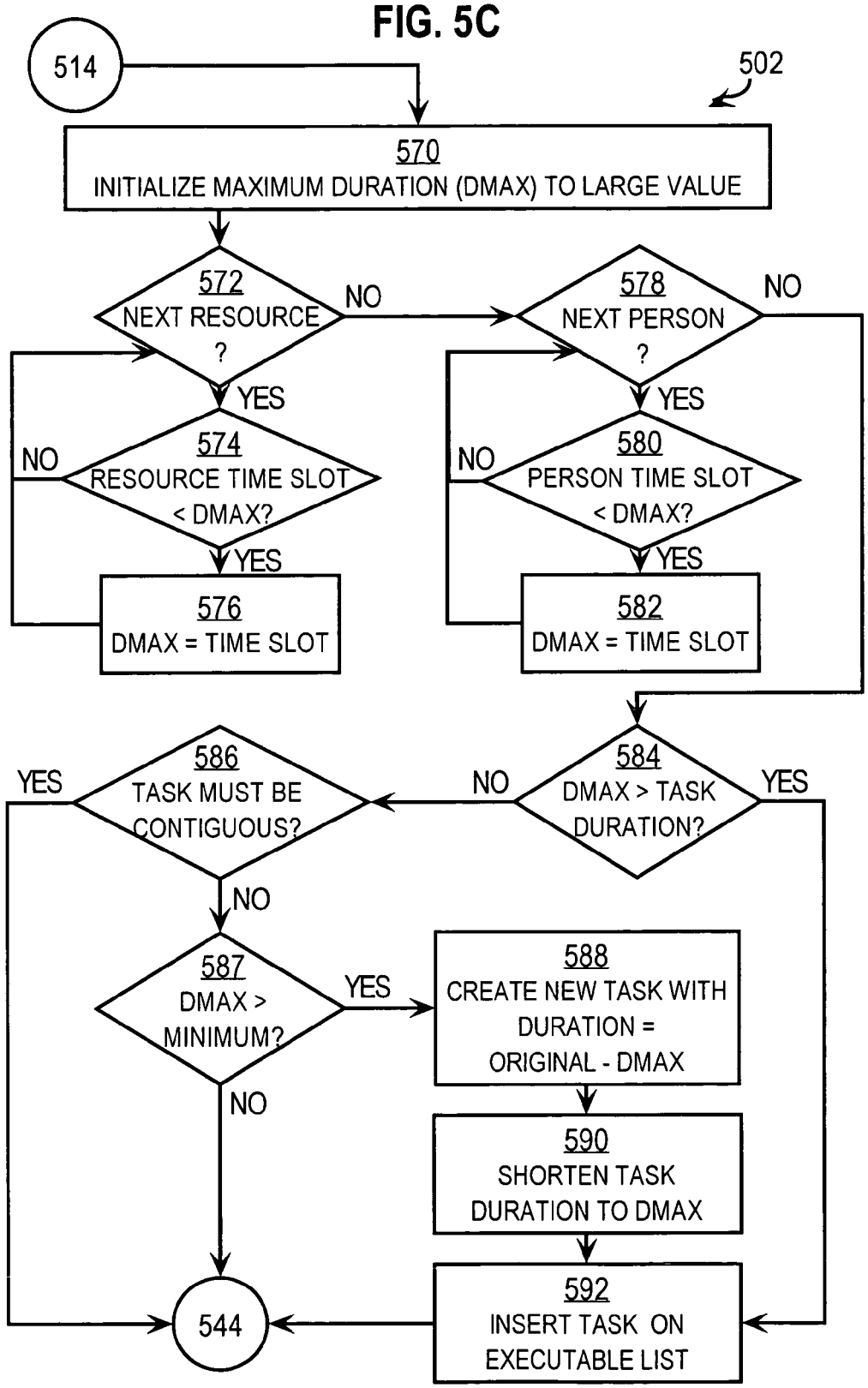
FIG. 5C is flow diagram that illustrates steps of a method for determining currently executable tasks, according to another embodiment.

The method used in FIG. 5A and FIG. 5B constitute one embodiment that may be used. A disadvantage of this embodiment is that in some circumstances a task is repeatedly broken up and the deferred tasks are merged together to form a remaining task. A more efficient embodiment 502 is described in FIG. 5C, in which a time slot that accommodates both participants and resources is first determined, and then a task is broken up into two short tasks. FIG. 5C is flow diagram that illustrates steps of a method 502 for determining currently executable tasks, according to another embodiment. In FIG. 5C, control passes to step 570 of embodiment 502 from step 514, which is described above with reference to FIG. 5A.

In embodiment 502, a value for a parameter DMAX is generated, representing the largest available timeslot duration (maximum duration) across all resources and participants. In some embodiments, the value for DMAX is expressed as a time stamp for the end of the period, similar to the way that the interrupt end times 276 are expressed. In the illustrated embodiment, DMAX is a duration as expressed as the difference between that timestamp and the current time.

In step 570, the value of DMAX is initialized to a large number, indicating infinite availability. Control then passes to step 572.

In step 572, the next resource to be processed is considered. If such a resource does not exist, control is passed to step 578. If another resource does exist, control is passed to step 574.

In step 574, it is determined whether the duration until the current resource stops being available is less than the value of DMAX. If the resource's available time is greater than or equal to the value of DMAX, the value of DMAX is still valid, and control passes back to step 572, where the next resource is considered. If not, control passes to step 576.

In step 576, the value of DMAX is updated based on the difference between the current time and the current resource's available time, effectively reducing the value of DMAX. Control then passes back to step 572, where the next resource is considered.

When all resources have been considered in step 572, control is passed to step 578, where each required participant is considered in turn. If there are no remaining participants, control passes to step 584. If there are remaining participants, control passes to step 580.

In step 580, it is determined whether the participant's smallest interruptability time, e.g., as indicated for an appropriate medium in field 276 of user data structure 270, has a duration less than DMAX. If a participant's smallest interruptability duration is greater than or equal to the value of DMAX, the value of DMAX is still valid, and control passes back to step 578, where the next participant is considered. If not, control passes to step 582.

In step 582, the value of DMAX is reduced to the difference between the curren time and the participant's smallest interruptability time for the appropriate media. Control then passes back to step 578, where the next participant is considered.

When all participants have been considered, control passes to step 584. In this step the value of DMAX is compared with the current task's expected duration. If DMAX is greater than the expected duration, all resources and required participants for the task are currently available for a sufficient duration to complete execution of the task, and control is passed to step 592, where the task is moved to the executable list. If DMAX is less than the expected duration, control is passed to step 586.

In step 586, which is reached only if all resources and participants are not available for a sufficiently long time to complete the task, the task's contiguity flag, e.g., field 244, is examined. If the task can be executed in discontinguous subtasks, control is passed to step 587. If the task must be executed contiguously, the task is not currently executable and is left on the startable list, passing control to step 544, where the next task will be considered.

In step 587, it is determined whether the largest available timeslot (the value of DMAX) is at least as large as some minimum duration. In an illustrated example, the minimum duration is the time stored in the contiguity field 244. This check ensures that tasks are not fragmented into unusable small timeslots. If the value of DMAX is greater than the minimum time, control is passed to step 588. If the value in DMAX is less than the minimum, the task is not executable and is thus not moved to the executable list. Control is passed to step 544, where the next task is considered.

In step 588, a new task is created. This task is identical to the current task in all respects, except its duration is smaller by the value of DMAX. This new task is placed at the end of the startable list, and control is passed to step 590.

In step 590, the current task's expected duration is set to the amount of time implied by the largest available timeslot, i.e., the value of DMAX, and control passed to step 592. Note that the cumulative effect of steps 588 and 590 is to split the current task into an immediately executable sub-task and a non-contiguous sub-task of the same task, to be executed when all resources and participants are once again available.

Whenever step 592 is reached, it implies that the considered task (or sub-task) is executable. The task is removed from the startable list and placed on the end of the executable list. Control is then passed to step 544.

In step 544, the next task on the startable list is considered, as described above with reference to FIG. 5A. As described above, if another startable task exists, control is passed back up to step 512, where the task's executablity will be evaluated. If no such startable task exists, all tasks have been considered, and control returns to step 450 where the executable and startable tasks will be displayed.

FIG. 6 is a flow diagram that illustrates a step 482 of the method of FIG. 4B for rescheduling a task, according to an embodiment 600. The steps of method 600 constitute a particular embodiment of step 482; in other embodiments of step 482 more, fewer or other steps, or some combination of changes, are used. Control passes to method 600 from step 480, described above, in which it is determined that there is a change in the status of a non-current task. In some embodiments, one or more steps of method 600 are performed by a separate process, such as a calendaring system, or conventional task server. In the illustrated embodiment, the dynamic task server 190 determines whether the start times for specific tasks should be modified to optimize the collaborators' schedules. For example, the task management system may have a task that it would like to insert into the calendars of the collaborators, but no common scheduled space is available before the latest start date/time for the task expires. In this embodiment, the dynamic task server 190 instructs the task system 170 to rearrange the collaborators' calendars to make room for the task.

In step 602, it is determined whether the change is that a proposed time for a rescheduled task (marked "pending insert" in the illustrated embodiment) has been rejected by a required participant. If so, control passes to step 670, described below. If not, control passes to step 604.

In step 604, it is determined whether the change is that a proposed time for a rescheduled task has been accepted by all required participants. If so, control passes to step 660, described below. Otherwise control passes to step 610 and following steps to re-schedule one or more scheduled tasks based on the changes to one or more tasks. A re-schedulable task already has a schedule, e.g., a value for the schedule start field 238; in addition it has a value in the reschedulable field 242 indicating that the task can be moved to a different time.

In step 610, task data is received for a reasonable number N of reschedulable tasks based on the change to the changed task. For example, if the changed task has to be moved to a later time to include a new person, then it is moved. This opens up a time slot that the changed task formerly occupied, so other tasks are reviewed to see if they fit in the open slot. To limit the computational resources spent in this effort, the number N of tasks reviewed is limited. Any order can be used to select the first N tasks. In an illustrated embodiment, the N highest priority tasks that follow the newly opened time slot are reviewed in priority order during step 610. Based on the quorum fields 220 for the selected task a number M of participants are identified who are involved in the N tasks. In some embodiments, there is a limit on the number M, so if too many participants are identified for the N tasks, then one or more of the first N tasks are removed from consideration to bring the number M within its limit.

It is recognized that determining tasks to re-schedule is a computation of NP-complete complexity, in that the process can eventually lead to re-scheduling all tasks for all persons in the collaborative population. Therefore, step 610 includes some approach to aggressively reduce the number of tasks considered for re-scheduling. In some embodiments, a maximum number of resources R is also defined and enforced.

In an example embodiment, during step 610, three lists are constructed. The first list, called the re-schedulable task list, contains a set of re-schedulable tasks. The second list, the re-schedulable participant list, contains a list of participants that would need their personal schedules changed as a result of a successful re-scheduling of any of the tasks on the re-schedulable task list. The third list, the re-schedulable resource list, contains a list of resources that would need their schedules changed as a result of a successful re-scheduling of any of the task on the reschedulable task list. Each of the three lists is limited to a fixed number of elements. For a task to be added to the re-schedulable task list, it should meet the following criteria:

1) It is re-schedulable.
2) It does not cause the number of tasks on the list to exceed the predefined number of elements N allowed on the list.
3) Merging all the participants on the task's quorum list onto the re-schedulable participant list does not cause the re-schedulable participant list to exceed the predefined number of elements M allowed on that list.
4) Merging all resources required by the task onto the re-schedulable resource list does not cause the re-schedulable participant list to exceed the predefined number of elements R allowed on that list.

For every task added to the re-schedulable task list, all of that task's quorum participants are added to the re-schedulable participants list unless adding a previous task had already caused them to be added. All of the tasks resources are added to the re-schedulable resource list unless adding a previous task had already caused a resource to be added In step 620, the available time slots for each of the M persons and resources are determined. In the illustrated embodiment, the user data structures 270 for the M participants are collected and used during step 620. These are time slots not yet committed for tasks each participant is already performing, not committed to executable tasks, or not committed to tasks that must be completed by a certain time. Control then passes to step 630. In some embodiments, step 620 includes determining the available time slots for each of the resources required by the N tasks. In some embodiments, a resource data structure similar to user data structure 270 indicates the time increments when a resource is available.

Steps 630, 632, 634, 650 constitute a loop over the re-schedulable tasks under consideration. If there are no re-schedulable tasks under consideration, these steps are skipped and control passes out of method 600 and to step 430 to determine executable task and re-sort for display, as described above.

In step 630, the next re-schedulable task under consideration is determined. Any method may be used to determine the next of the up to N tasks under consideration. In the illustrated embodiment, the highest priority task of the up to N tasks is considered the next reschedulable task. Control then passes to step 632.

In step 632, one or more time slots are determined when all required resources and all required media for all required persons for the task are available. For example, these time slots are determined by a logical AND on all time increments for the available time slots from step 620 for the required participants (and resources). Each time slot is then compared to the minimum useful time (e.g., in the contiguity field 244) and preparation time (e.g., in the preparation time field 246) to select a time slot that starts far enough after the current time to allow the preparation time and is long enough to fit the minimum useful time.

In step 634, it is determined whether such a time slot is found. If not, the task is not re-scheduled and control passes to step 650.

In step 650, it is determined whether there is another task to consider. If so, control passes back to step 630 to determine the next task. If not, control passes out of method 600 to step 430 of FIG. 4A, describe above, to determine executable tasks and re-sort the list of tasks.

If it is determined in step 634, that a time slot is found that satisfies the criteria for re-scheduling a task, control passes to step 640. In step 640, the task (or a first sub-task of the task) is copied to the time slot and marked as "pending insert." The mark can be made in any appropriate field in the task data structure. For example, in some embodiments, a value indicating "pending insert" is stored in stage field 218. In some embodiments, a value indicating "pending insert" is stored in reschedulable field 242. In some embodiments, a value indicating "pending insert" is stored in another field (not shown). Also, in step 640, the original task is left in place and marked as "pending remove." The mark can be made in any appropriate field in the task data structure. A notification is then sent to all persons involved in the task about the re-scheduled time slot. Control then passes to step 650, described above.

The new schedule does not become final until all required persons accept the task with the new time slot. User responses are handled in the illustrated embodiment as event data received during step 452.

As described above, if an event is received that indicates a required user has rejected the re-scheduled time slot, that case is determined in step 603 and control passes to step 670. In step 670, the task marked "pending insert" is deleted. The task marked "pending remove" is marked normally, e.g., as "accepted" in stage field 218 or as "re-schedulable" in reschedulable field 242. Thus the task is returned to its originally scheduled time slot.

As described above, if an event is received that indicates the last required person (and thus all required persons) has accepted the re-scheduled time slot, that case is determined in step 604, and control passes to step 660. In step 660, the task marked "pending removal" is deleted. The task marked "pending insert" is marked normally, e.g., as "accepted" in stage field 218 or as "re-schedulable" in reschedulable field 242. Thus the task is moved to the rescheduled time slot.

As demonstrated by the steps of method 400 and 500 and 600, by monitoring what tasks the user is currently performing and integrating that information into rich presence data, a dynamic task management system can be produced that allows opportunistic scheduling of collaborative tasks, and overlapping tasks. In addition, even traditional personally scheduled tasks can be dynamically rescheduled as conditions change and overlap.

3.3 Example use of Method at User Monitor

The above components can be integrated to produce an enhanced dynamic task scheduling application. The following narrative describes how such an application works in a particular example embodiment.

User Bob begins executing the application at 1:00 PM. A user monitor on Bob's host immediately asks him which of the following executable tasks he's going to work on first:

a) his regularly scheduled 1:00 PM staff meeting (attended by conference call);

b) a task to work with Alice about a design problem; or c) the software module that he's due to integrate next week. In response, Bob selects a) and conferences into his staff meeting. Bob indicates in his response to prompts from his user monitor that the staff meeting can be interrupted by instant messaging (IM) messages or high-priority voice calls.

In response to this state data for Bob, the dynamic task server determines opportunistic executable tasks and passes that information to Bob's user monitor. For example, the dynamic task server 190 detects a new emergency collaborative task created by Carol involving Bob and Dale and determines that Carol, Bob and Dale are present and executing tasks that are interruptible for the media of the task, a conference call. As a result, Bob's user monitor presents a pop-up window to Bob with information that Carol would like 5 minutes for a conference call. Bob accepts this new task causing an event recognized by step 458. The user monitor 114 informs the dynamic task server 190 which sets up the conference call, as described above for step 459. The conference with Carol and Dale begins. When the call with Carol and Dale is over, Bob returns to his staff meeting.

Bob finds that the staff meeting lacks information of importance to him, so Bob decides to cut away and do the task with Alice. But just as he is about to do so, the task is removed, because Alice's presentity state or her current task now makes her uninterruptible for voice calls. So Bob returns to the staff meeting.

During the staff meeting, Bob is handed an action item to meet with Elmer, Fiona, Gertrude, Henry, and Isaiah. Bob estimates that the task will require 2 hours of time, and he enters it as a task that will require his undivided attention (i.e. he can't be interrupted by any media), and that must be performed within a week. The dynamic task server 190 looks at the calendars of the people in question and determines that it's unlikely that the item can be accomplished on an ad-hoc basis (e.g., based on the default interruptibility data, the scheduled tasks for all of the participants are not interruptible with the required media), so it recommends that Bob schedule the task in the calendar for 3 days from now at 3:00. It therefore goes into everybody's task list at that time. Bob does so, but also requests that the task be marked reschedulable. Because this is a scheduled meeting, the earliest and latest start times (in fields 232 and 234) for the task are identical in the illustrated embodiment, thereby restricting the start task to a specific time and date. In an alternative embodiment, the scheduled time is contained in the scheduled start field 238.

Another action item for Bob requires that he talk to Jezebel to get a quick answer on something. He enters this task as doable over IM, with an estimated duration of 5 minutes. The dynamic task server detects that because Jezebel is in a meeting for which she has marked herself as interruptible by IM, Bob's task is added to her executable list and appears on her screen by action of her user monitor. She selects the task to become active, and pops up on IM to Bob asking what he needs from her to handle the task. They exchange IM messages for a minute or so, after which Bob tells enters the task as complete in his user monitor.

After the staff meeting, Bob indicates to his user monitor that he is working on his software task. A bit later, he gets a pop-up saying that Alice is now available, so he selects the task with Alice. The dynamic task server receives this information and creates the connection between Bob and Alice using the collaboration framework server 160. They discuss what they need to, and that task is completed and retired.

Bob codes for a bit longer, but then the source code control system goes down and an outbreak of food poisoning in another building miraculously makes Elmer, Fiona, Gertrude, Henry, and Isaiah all available for the rest of the afternoon. This meeting was previously marked as re-schedulable with a very short preparation time 246, so they all receive a pop-up indicating that it's possible to have almost immediately the meeting that was scheduled for 3 days from now. They all tell their user monitors that they are willing to conduct the meeting now, and a conference call is automatically started while the dynamic task manager removes the task from everybody's calendar.

Meanwhile, Kilroy and Leo cancel a meeting, creating a free timeslot 2 days from now for a meeting that was previously scheduled between them and Bob for 3 weeks from now. Because the meeting specifies that only 1 day of re-scheduling preparation time is needed, all 3 are notified of the scheduling change, and the meeting is moved on all of their calendars to the slot 2 days hence.

4.0 Implementation Mechanisms—Hardware Overview

Figure 7:
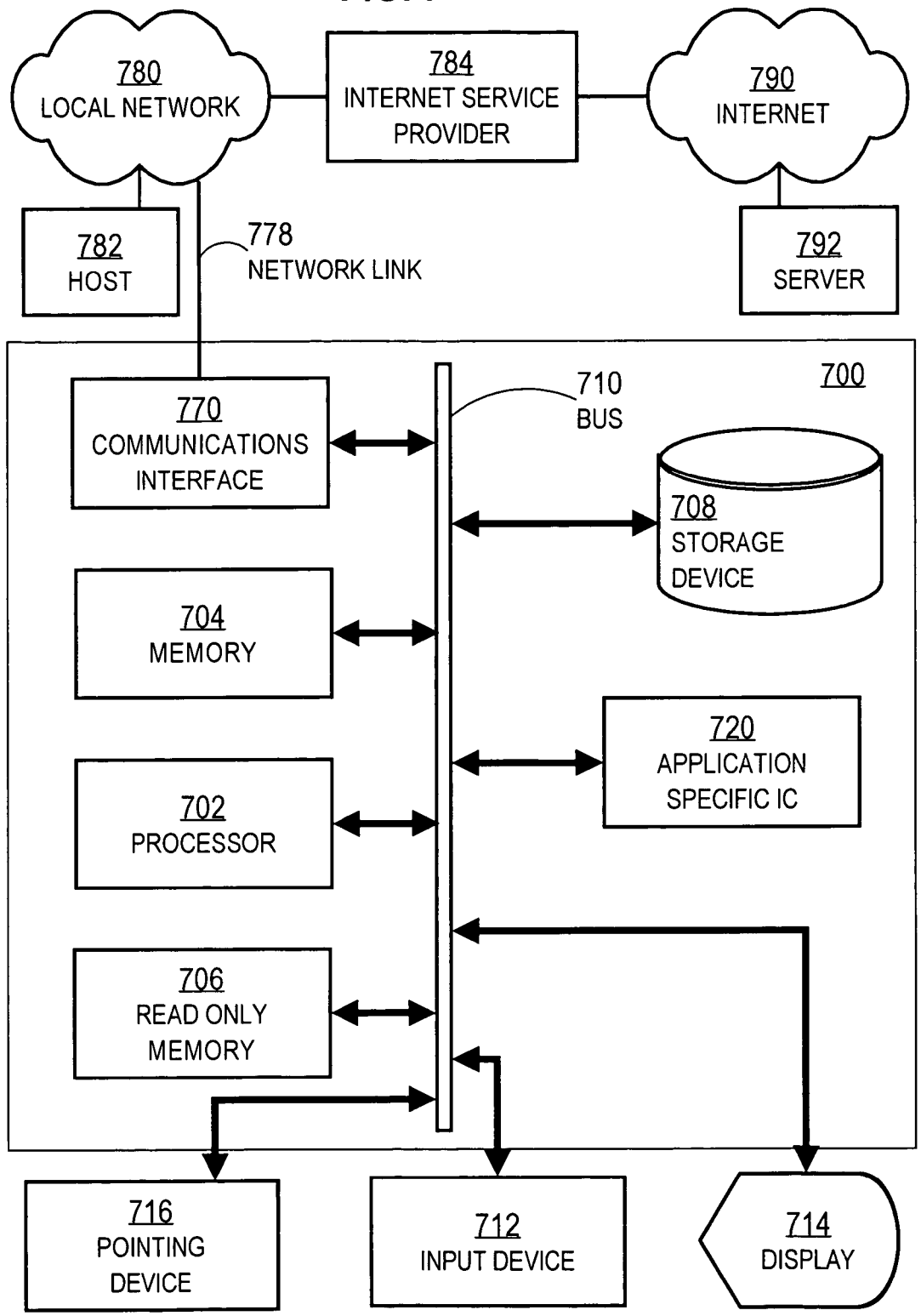
FIG. 7 is a block diagram that illustrates a computer system upon which an embodiment of the invention may be implemented

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, which carry information to and from computer system 700, are exemplary forms of carrier waves. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A non-transitory computer-readable storage medium storing one or more sequences of instructions for determining a task to be performed by a participant, wherein execution of the one or more sequences of instructions by one or more processors causes the one or more processors to perform the steps of:

receiving task data from a database that indicates a plurality of tasks to be performed by a plurality of participants, the task data including a task description field for each of the tasks, the task description field describing a corresponding one of the tasks;

receiving quorum data from the database that indicates a particular participant set of one or more participants of the plurality of participants to participate in a particular task of the plurality of tasks;

receiving personal interruptibility data from the database that indicates, for a participant among the particular participant set, a particular communications medium through which the participant is interruptible while the participant performs a current task set that excludes the particular task, the current task set including the tasks that the participant is currently performing and for which the task data is received from the database, the personal interruptibility data associated in the database with the task data for the tasks in the current task set; and determining a particular time interval to perform the particular task based at least in part on the personal interruptibility data.

2. The non-transitory computer-readable storage medium as recited in claim 1, said step of receiving personal interruptibility data further comprising receiving medium time slot data that indicates a time during which the participant can be interrupted through the particular communications medium while performing the current task set.

3. The non-transitory computer-readable storage medium as recited in claim 1, wherein at least one of the current task and the particular task is a collaborative task that requires participation by more than one participant of the plurality of participants.

4. The non-transitory computer-readable storage medium as recited in claim 1, said step of receiving task data further comprising receiving preparation time data that indicates how much time a participant needs to prepare for the particular task after the particular task is scheduled and before the particular task commences.

5. The non-transitory computer-readable storage medium as recited in claim 4, said step of determining the particular time interval to perform the particular task further comprising:

determining a particular time interval when the particular participant set is available;

determining whether the particular time interval begins sooner than the preparation time after a current time; and if it is determined that the particular time interval does not begin sooner than the preparation time after a current time, then scheduling the particular task for the particular time interval.

6. The non-transitory computer-readable storage medium as recited in claim 1, said step of receiving task data further comprises receiving rescheduling data that indicates whether the particular task can be rescheduled if a time interval opens up for the particular participant set.

7. The non-transitory computer-readable storage medium as recited in claim 6, said step of determining the particular time interval to schedule the particular task further comprising:

determining a different time interval from an originally scheduled time interval during which different time interval the particular participant set is available;

determining whether the particular task can be rescheduled during the different time interval; and if it is determined that the particular task can be rescheduled, then scheduling the particular task for the different time interval.

8. The non-transitory computer-readable storage medium as recited in claim 7, said step of determining whether the particular task can be rescheduled during the different time interval further comprising receiving response data that indicates whether every required participant agrees to the different time interval.

9. The non-transitory computer-readable storage medium as recited in claim 7, wherein the different time interval begins at the current time.

10. The non-transitory computer-readable storage medium as recited in claim 6, said step of receiving rescheduling data further comprising receiving rescheduling data that indicates that the particular task can be rescheduled if an earlier time interval opens up for the particular participant set.

11. The non-transitory computer-readable storage medium as recited in claim 1, said step of receiving task data further comprising:

receiving duration data that indicates an expected duration of time for completing the particular task; and receiving contiguity data that indicates whether the particular task can be performed in a plurality of short duration tasks each shorter than the expected duration.

12. The non-transitory computer-readable storage medium as recited in claim 11, said step of determining the particular time interval to schedule the particular task initiated in response to actively monitoring the tasks for changes and detecting a change in at least one of the tasks, said step of determining the particular time interval to schedule the particular task further comprising:

determining a particular time interval less than the expected duration when the particular participant set is available; and if the contiguity data indicates that the particular task can be performed in a plurality of short duration tasks, then scheduling a during the particular time interval a particular short duration task of the plurality of short duration tasks.

13. The non-transitory computer-readable storage medium as recited in claim 1, said step of receiving task data further comprising receiving required media data that indicates a set of one or more communications media to be used as a minimum for conducting the particular task.

14. The non-transitory computer-readable storage medium as recited in claim 13, said step of determining the particular time interval to schedule the particular task further comprising determining whether to schedule the particular task at the current time by determining, based on the personal interruptibility data, whether every participant of the particular participant set is interruptible for all media indicated by the required media data.

15. The non-transitory computer-readable storage medium as recited in claim 1, said step of determining the particular time interval to schedule the particular task further comprising notifying the participant of an opportunity to perform the particular task at the current time.

16. The non-transitory computer-readable storage medium as recited in claim 1, said step of determining the particular time interval to schedule the particular task further comprising notifying the participant of an opportunity to reschedule the particular task.

17. The non-transitory computer-readable storage medium as recited in claim 1, further comprising engaging resources to perform the particular task based at least in part on the time interval to schedule the particular task.

18. The non-transitory computer-readable storage medium as recited in claim 1, wherein:

execution of the one or more sequences of instructions further causes the one or more processors to perform the step of receiving other task status data that further describes the current task set; and determining the particular time interval based in part on the other task data.

19. The non-transitory computer-readable storage medium as recited in claim 18, wherein:
   said step of receiving other task status data further comprises receiving other task status data that indicates a completed task of the current task set has been completed; and
   said step of determining the particular time interval further comprises
   determining resources freed by the completed task, and
   determining the particular time interval based in part on the resources freed by the completed task.

20. The non-transitory computer-readable storage medium as recited in claim 1, said step of receiving personal interruptibility data further comprising receiving the personal interruptibility data in rich presence data from a presence server.

21. A non-transitory computer-readable storage medium storing one or more sequences of instructions for scheduling a task to be performed by a participant, wherein execution of the one or more sequences of instructions by one or more processors causes the one or more processors to perform the steps of:
   receiving, from a database, task data for a plurality of tasks to be performed by a plurality of participants, wherein receiving the task data comprises receiving required media data and task interruptibility data from the database for each task of the plurality of tasks, the required media data indicates a required set of one or more communications media of a plurality of communications media is required to perform a respective one of the tasks, and the task interruptibility data indicates whether the respective one of the tasks can be interrupted through a particular communications medium of the plurality of communications media, wherein the task data includes a task description field for each respective one of the tasks, and the respective task description field describes each respective one of the tasks;
   receiving quorum data from the database that indicates a participant set of one or more participants of the plurality of participants to participate in each task of the plurality of tasks; and
   determining a particular time interval to schedule both a first task and a second task based on the required media data, and the quorum data, and whether the task interruptibility data indicates that the first task can be interrupted to schedule the second task.

22. The non-transitory computer-readable storage medium as recited in claim 21, wherein:
   execution of the one or more sequences of instructions further causes the one or more processors to perform the step of receiving current user data that indicates, for a participant among the plurality of participants, that the participant is performing at the current time a current task of the plurality of tasks;
   the first task is the current task; and
   said step of determining the particular time interval to schedule both the first task and the second task further comprises determining to schedule both the current task and the second task at the current time.

23. The non-transitory computer-readable storage medium as recited in claim 21, wherein at least one of the first task and the second task is a collaborative task that requires participation by more than one participant of the plurality of participants.

24. The non-transitory computer-readable storage medium as recited in claim 21, wherein:
   said step of receiving task data further comprises receiving for each task of the plurality of tasks reschedulable data that indicates whether the task can be rescheduled to a different time, and
   said step of determining the particular time interval further comprises
   determining whether the first task is scheduled for a different time interval and can be rescheduled, and
   if it is determined the first task is scheduled for a different time interval and can be rescheduled, then determining the particular time interval.

25. The non-transitory computer-readable storage medium as recited in claim 21, said step of receiving task data further comprises:
   receiving for each task of the plurality of tasks estimated duration data that indicates an amount of time to complete the task, and
   contiguity data that indicates whether the task can be broken into a plurality of short duration tasks each shorter than the amount of time indicated by the estimated duration data.

26. The non-transitory computer-readable storage medium as recited in claim 25, said step of determining the particular time interval further comprising:
   determining the particular time interval less than a first expected duration for the first task when a first participant set to participate in the first task is available; and
   if the contiguity data indicates that the first task can be performed in a plurality of short duration tasks, then scheduling during the particular time interval a particular short duration task of the plurality of short duration tasks.

27. The non-transitory computer-readable storage medium as recited in claim 21, said step of determining the particular time interval further comprising notifying the participant of an opportunity to perform at least one of the first task and the second task at the current time.

28. The non-transitory computer-readable storage medium as recited in claim 21, said step of determining the particular time interval further comprising notifying the participant of an opportunity to reschedule at least one of the first task and the second task.

29. The non-transitory computer-readable storage medium as recited in claim 21, further comprising engaging resources to perform at least one of the first task and the second task based at least in part on the particular time interval.

30. The non-transitory computer-readable storage medium as recited in claim 22, wherein:
   said step of receiving current user data further comprises receiving current user data that indicates the current task has been completed; and
   said step of determining the particular time interval further comprises
   determining resources freed by the current task, and
   determining the particular time interval based in part on the resources freed by the current task.

31. A non-transitory computer-readable storage medium storing one or more sequences of instructions for determining a task to be performed by a participant, wherein execution of the one or more sequences of instructions by one or more processors causes the one or more processors to perform the steps of:
   receiving task data from a database that indicates a plurality of tasks to be performed by a particular participant, the task data including a task description field for each of the tasks, the task description field describing a corresponding one of the tasks;

receiving input data from the database that describes a current user state of the particular participant, the current user state of the particular participant comprising personal interruptibility data and a current task of the plurality of tasks, the current task being one of the tasks performed currently by the particular participant, the personal interruptibility data indicating whether the particular participant is interruptible during performance of the current task, and the current task being associated with the personal interruptibility data in the database; and sending to a task manager process a message that includes current user data comprising the current user state and the personal interruptibility data, wherein the task manager process determines, based on the current user data, a particular time interval to schedule, from among the plurality of tasks, a different task than the current task.

32. The non-transitory computer-readable storage medium as recited in claim 31, wherein the personal interruptibility data indicates whether the particular participant can be interrupted during the current task through a particular communications medium of a plurality of communications media.

33. The non-transitory computer-readable storage medium as recited in claim 32, said step of receiving personal interruptibility data further comprising receiving medium time slot data that indicates a time during which the particular participant can be interrupted through the particular communications medium.

34. The non-transitory computer-readable storage medium as recited in claim 31, said step of receiving input data further comprising prompting a human to report at least part of the input data.

35. The non-transitory computer-readable storage medium as recited in claim 31, said step of receiving input data further comprising receiving input data that indicates the current task.

36. The non-transitory computer-readable storage medium as recited in claim 31, wherein:
said step of receiving task data further comprises receiving, from the task manager process, proposal data that indicates the different task could be performed by a particular communications medium in a time interval that overlaps a duration of the current task; and
said step of receiving input data from the participant further comprises
presenting for human viewing presentation data based on the proposal data, and
receiving, from a human, response data that indicates whether the particular participant will concurrently participate in the current task and the different task.

37. The non-transitory computer-readable storage medium as recited in claim 36, wherein the particular communications medium is at least one of instant messaging, voice, video, and network application collaboration.

38. The non-transitory computer-readable storage medium as recited in claim 31, said step of receiving input data further comprising receiving input data that indicates that the particular participant has completed the current task.

39. The non-transitory computer-readable storage medium as recited in claim 31, said step of receiving input data further comprising receiving preparation time data that indicates how much time the particular participant needs to prepare for a particular task of the plurality of tasks after the particular task is scheduled and before the particular task commences.

40. The non-transitory computer-readable storage medium as recited in claim 31, said step of receiving task data further comprising receiving rescheduling data that indicates whether the a particular task of the plurality of tasks can be rescheduled if a time interval opens up for a particular participant set of one or more participants to participate in the particular task.

41. The non-transitory computer-readable storage medium as recited in claim 40, said step of receiving rescheduling data further comprising receiving rescheduling data that indicates that the different task can be rescheduled if an earlier time interval opens up for the particular participant set.

42. The non-transitory computer-readable storage medium as recited in claim 31, said step of receiving task data further comprising:
receiving duration data that indicates an expected duration of time for completing a particular task of the plurality of tasks; and
receiving contiguity data that indicates whether the particular task can be performed in a plurality of short duration tasks each shorter than the expected duration.

43. The non-transitory computer-readable storage medium as recited in claim 31, said step of receiving task data further comprising receiving required media data that indicates a set of one or more communications media to be used as a minimum for conducting a particular task of the plurality of tasks.

44. The non-transitory computer-readable storage medium as recited in claim 31, said step of receiving task data further comprising receiving interruptible data that indicates that a particular task of the plurality of tasks can be interrupted by a particular communications medium.

45. The non-transitory computer-readable storage medium as recited in claim 31, said step of sending a message that includes current user data further comprising sending the current user data as rich presence data in a message to a presence server.

46. A non-transitory computer-readable storage medium storing one or more sequences of instructions for rescheduling a task to be performed by a participant, wherein execution of the one or more sequences of instructions by one or more processors causes the one or more processors to perform the steps of:
receiving scheduled task data over a network that indicates a plurality of tasks scheduled to be performed by a particular participant, the scheduled task data including a task description field for each of the tasks, the task description field describing a corresponding one of the tasks;
receiving participant availability data over the network that indicates when a participant in a participant set of one or more participants required to perform a first task of the plurality of tasks is available, the participant availability data comprising a current task of the plurality of tasks, the current task being currently performed by the participant, the current task being different than the first task, and the participant availability data further comprising personal interruptibility data comprising an indication of whether the participant is interruptible during performance of the current task, the personal interruptibility data being associated in the database with the current task;
determining whether all participants in the participant set are available to re-schedule the first task for a different time interval based on the personal interruptibility data; and
if it is determined that all participants in the participant set are available for the different time interval, then
associating with the first task rescheduled data that indicates the first task is rescheduled for removal, adding to the scheduled task data a second task for the different time interval, and associating with the second task pending data that indicates the second task is rescheduled for insertion.

47. The non-transitory computer-readable storage medium as recited in claim 46, wherein execution of the one or more sequences of instructions further causes the one or more processors to perform the steps of:

determining whether all participants in the participant set agree to the different time interval; and if it is determined that all participants in the participant set agree to the different time interval, then performing the steps of deleting the first task, and removing the pending data from association with the second task.

48. The non-transitory computer-readable storage medium as recited in claim 47, wherein execution of the one or more sequences of instructions further causes the one or more processors to perform the step of:

if it is determined that all participants in the participant set do not agree to the different time interval, then performing the steps of deleting the second task, and removing the rescheduled data from association with the first task.

49. The non-transitory computer-readable storage medium as recited in claim 46, wherein:

execution of the one or more sequences of instructions further causes the one or more processors to perform the step of determining whether all resources required to perform the first task are available to re-schedule the first task of the plurality of tasks for the different time interval; and said step of determining whether all participants in the participant set are available for the different time interval, further comprises determining whether all resources are available for the different time interval.

50. The non-transitory computer-readable storage medium as recited in claim 46, said step of determining whether all participants in the participant set are available to re-schedule the first task of the plurality of tasks for the different time interval further comprising:

receiving, from a presence server, rich presence data that indicates current interruptibility of a particular participant of the participant set; and determining whether all participants in the participant set are available based at least in part on the rich presence data.

51. An apparatus for determining a task to be performed by a participant, comprising:

a processor;

a memory comprising executable instructions, the executable instructions executable with the processor to:

receive task data from a database that indicates a plurality of tasks to be performed by a plurality of participants, the task data including a task description field for each of the tasks, the task description field describing a corresponding one of the tasks;

receive quorum data from the database that indicates a particular participant set of one or more participants of the plurality of participants to participate in a particular task of the plurality of tasks;

receive personal interruptibility data from the database, the personal interruptibility data indicating, for a participant among the particular participant set, a particular communications medium through which the participant is interruptible while the participant performs a current task set that excludes the particular task, the current task set including the tasks that the participant is currently performing, wherein the personal interruptibility data is associated in the database with the current task set; and determine a particular time interval to perform the particular task based at least in part on the personal interruptibility data.

52. An apparatus for scheduling a task to be performed by a participant, comprising:

a processor;

a memory comprising executable instructions, the executable instructions executable with the processor to:

receive task data over a network for a plurality of tasks to be performed by a plurality of participants, wherein receiving the task data comprises receiving required media data and task interruptibility data from the database for each task of the plurality of tasks, the required media data indicates a required set of one or more communications media of a plurality of communications media is required to perform a respective one of the tasks, and the task interruptibility data indicates whether the respective one of the tasks can be interrupted through a particular communications medium of the plurality of communications media, the task data includes a task description field for each respective one of the tasks, and the respective task description field describes each respective one of the tasks;

receive quorum data over the network that indicates a participant set of one or more participants of the plurality of participants to participate in each task of the plurality of tasks; and determine a particular time interval to schedule both a first task and a second task based on the required media data, the quorum data, and whether the task interruptibility data indicates that the first task can be interrupted to schedule the second task.

53. An apparatus for determining a task to be performed by a participant, comprising:

a processor;

a memory comprising executable instructions, the executable instructions executable with the processor to:

receive task data from a database that indicates a plurality of tasks to be performed by a particular participant, the task data including a task description field for each of the tasks, the task description field describing a corresponding one of the tasks;

receive input data from an input device that describes a current user state of the particular participant, the input data including a current task of the plurality of tasks that is being performed currently by the particular participant, and the input data further including an indication of whether the particular participant is interruptible while the particular participant performs the current task; and send to a task manager process a message that includes current user data based on the input data, wherein the task manager process determines, based on the indication of whether the particular participant is interruptible while the particular participant performs the current task, a particular time interval to schedule, from among the plurality of tasks, a different task than the current task.

54. An apparatus for re-scheduling a task to be performed by a participant, comprising:

a processor;

a memory comprising executable instructions, the executable instructions executable with the processor to:

receive scheduled task data from a database that indicates a plurality of tasks scheduled to be performed by a particular participant, the scheduled task data including a task description field for each of the tasks, the task description field describing a corresponding one of the tasks;

receive participant availability data from an input device that indicates when a participant in a participant set of one or more participants required to perform a first task of the plurality of tasks is available and that identifies a current task of the plurality of tasks that is being performed currently by the participant, the current task being different than the first task, and participant availability data further including an indication of whether the participant is interruptible while performing the current task, the personal interruptibility data being associated in the database with the scheduled task data for the current task;

determine whether all participants in the participant set are available to re-schedule the first task for a different time interval based on the personal interruptibility data; and associate with the first task rescheduled data that indicates the first task is rescheduled for removal, add to the scheduled task data a second task for the different time interval, and associate with the second task pending data that indicates the second task is rescheduled for insertion, if it is determined that all participants in the participant set are available for the different time interval.

55. An apparatus for determining a task to be performed by a participant, comprising:

a network interface that is coupled to a network for communicating one or more packet flows therewith;

one or more processors;

a computer-readable medium; and one or more stored sequences of instructions stored on the computer-readable medium, which, when executed by the one or more processors, cause the one or more processors to carry out the steps of:

receiving task data from a database that indicates a plurality of tasks to be performed by a plurality of participants, the task data including a task description field for each of the tasks, the task description field describing a corresponding one of the tasks;

receiving quorum data from the database that indicates a particular participant set of one or more participants of the plurality of participants to participate in a particular task of the plurality of tasks;

receiving through the network interface personal interruptibility data that indicates, for a participant among the particular participant set, a particular communications medium through which the participant is interruptible while the participant performs a current task set that excludes the particular task, the current task set including the tasks that the participant is currently performing and for which the task data is received from the database, wherein the personal interruptibility data is associated in the database with the current task set; and determining a particular time interval to perform the particular task based at least in part on the personal interruptibility data.

56. An apparatus for scheduling a task to be performed by a participant, comprising:

a network interface that is coupled to a network for communicating one or more packet flows therewith;

one or more processors;

a computer-readable medium; and one or more stored sequences of instructions stored on the computer-readable medium, which, when executed by the one or more processors, cause the one or more processors to carry out the steps of:

receiving task data from a database for a plurality of tasks to be performed by a plurality of participants, wherein receiving the task data comprises receiving required media data and task interruptibility data from the database for each task of the plurality of tasks, the required media data indicates a required set of one or more communications media of a plurality of communications media is required to perform a respective one of the tasks, and the task interruptibility data indicates whether the respective one of the tasks can be interrupted through a particular communications medium of the plurality of communications media, wherein the task data includes a task description field for each respective one of the tasks, and the respective task description field describes each respective one of the tasks; and determining a particular time interval to schedule both a first task and a second task based on the required media data, and whether the task interruptibility data indicates that the first task can be interrupted to schedule the second task.

57. An apparatus for determining a task to be performed by a participant, comprising:

a network interface that is coupled to a network for communicating one or more packet flows therewith;

one or more processors;

a computer-readable medium; and one or more stored sequences of instructions stored on the computer-readable medium, which, when executed by the one or more processors, cause the one or more processors to carry out the steps of:

receiving through the network interface task data that indicates a plurality of tasks to be performed by a particular participant, the task data including a task description field for each of the tasks, the task description field describing a corresponding one of the tasks;

receiving input data from an input device that indicates a current user state of the particular participant, the input data including a current task of the plurality of tasks that is being performed currently by the particular participant, and the input data further including an indication of whether the current task is interruptible while the particular participant performs the current task; and sending to a task manager process through the network interface a message that includes current user data based on the input data, wherein the task manager process determines, based on the indication of whether the particular participant is interruptible while the particular participant performs the current task, a particular time interval to schedule~from among the plurality of tasks, a different task than the current task.

58. An apparatus for re-scheduling a task to be performed by a participant, comprising:

a network interface that is coupled to a network for communicating one or more packet flows therewith;

one or more processors;

a computer-readable medium; and one or more stored sequences of instructions stored on the computer-readable medium, which, when executed by the one or more processors, cause the one or more processors to carry out the steps of:

receiving scheduled task data from a database that indicates a plurality of tasks scheduled to be performed by a particular participant, the scheduled task data including a task description field for each of the tasks, the task description field describing a corresponding one of the tasks;

receiving through the network interface participant availability data that indicates when a participant in a participant set of one or more participants required to perform a first task of the plurality of tasks is available, wherein the participant availability data includes a current task currently performed by the participant and whether the current task is interruptible, the current task being one of the plurality of tasks different from the first task;

determining whether all participants in the participant set are available to re-schedule the first task for a different time interval based on whether the current task is interruptible; and if it is determined that all participants in the participant set are available for the different time interval, then associating with the first task rescheduled data that indicates the first task is rescheduled for removal, adding to the scheduled task data a second task for the different time interval, and associating with the second task pending data that indicates the second task is rescheduled for insertion.

59. A method for determining a task to be performed by a participant, comprising the steps of:

receiving task data from a database that indicates a plurality of tasks to be performed by a plurality of participants, the task data including a task description field for each of the tasks, the task description field describing a corresponding one of the tasks;

receiving quorum data from the database that indicates a particular participant set of one or more participants of the plurality of participants to participate in a particular task of the plurality of tasks;

receiving personal interruptibility data from the database that indicates, for a participant among the particular participant set, a particular communications medium through which the participant is interruptible while the participant performs a current task set that excludes the particular task, the current task set including the tasks that the participant is currently performing and for which the task data is received from the database, wherein the personal interruptibility data is associated in the database with the current task set; and determining a particular time interval to perform the particular task based at least in part on the personal interruptibility data.

60. A method for scheduling a task to be performed by a participant, comprising the steps of:

receiving task data for a plurality of tasks to be performed by a plurality of participants from a database, wherein receiving the task data comprises receiving required media data and task interruptibility data from the database for each task of the plurality of tasks, the required media data indicates a required set of one or more communications media of a plurality of communications media is required to perform a respective one of the tasks, and the task interruptibility data indicates whether the respective one of the tasks can be interrupted through a particular communications medium of the plurality of communications media while the task is being performed, and wherein the task data includes a task description field for each respective one of the tasks, and the respective task description field describes each respective one of the tasks;

receiving quorum data through a network interface that indicates a participant set of one or more participants of the plurality of participants to participate in each task of the plurality of tasks; and determining a particular time interval to schedule both a first task and a second task based on the required media data, the quorum data, and whether the task interruptibility data indicates that the first task can be interrupted to schedule the second task.

61. A method for determining a task to be performed by a participant, comprising the steps of:

receiving task data from a database that indicates a plurality of tasks to be performed by a particular participant, the task data including a task description field for each of the tasks, the task description field describing a respective one of the tasks;

receiving input data via a network interface that describes a current user state of the particular participant, the current user state comprising a current task of the plurality of tasks that is performed currently by the particular participant, and an indication of whether the current task is interruptible while the particular participant performs the current task, the current task being associated in the database with the indication of whether the current task is interruptible; and sending to a task manager process a message that includes current user data comprising the current task and the indication of whether the current task is interruptible, wherein the task manager process determines, based on the current user data, a particular time interval to schedule from among the plurality of tasks a different one of the tasks than the current task.

62. A method for re-scheduling a task to be performed by a participant, comprising the steps of:

receiving scheduled task data from a database that indicates a plurality of tasks scheduled to be performed by a particular participant, the scheduled task data including a task description field for each of the tasks, the task description field describing a respective one of the tasks;

receiving participant availability data via a network interface that indicates when a participant in a participant set of one or more participants required to perform a first task of the plurality of tasks is available, the participant availability data identifying a current task that is currently performed by the participant, the current task being a different one of the tasks than the first task, and the participant availability data further including an indication of whether the current task is interruptible while the current task is performed by the participant, the current task being associated in the database with the indication of whether the current task is interruptible;

determining whether all participants in the participant set are available to re-schedule the first task for a different time interval based at least in part on the indication of whether the current task is interruptible; and if it is determined that all participants in the participant set are available for the different time interval, then associating with the first task rescheduled data that indicates the first task is rescheduled for removal, adding to the scheduled task data a second task for the different time interval, and associating with the second task pending data that indicates the second task is rescheduled for insertion.

63. A system for determining a task to be performed by a participant, comprising:

a participant monitor comprising a first network interface that is coupled to a network for communicating one or more packet flows therewith;

a first processor set of one or more processors;

a first computer-readable medium; and a first instruction set of one or more stored sequences of instructions stored on the computer-readable medium; and a dynamic task manager comprising a second network interface that is coupled to a network for communicating one or more packet flows therewith;

a second processor set of one or more processors;

a second computer-readable medium; and a second instruction set of one or more stored sequences of instructions stored on the computer-readable medium, wherein;

execution of the first instruction set by the first processor set, causes the first processor set to carry out the steps of receiving task data over the first network interface that indicates a plurality of tasks to be performed by a particular participant, the task data including a task description field for each of the tasks, the task description field describing a respective one of the tasks, receiving input data from an input device that describes a current state of a current task among the plurality of tasks, the current task performed currently by the particular participant, the input data further indicating whether the current task is interruptible while the current task is performed by the particular participant, and sending to the dynamic task manager through the first network interface a message that includes an indication of whether the current task is interruptible while the current task is performed by the particular participant; and execution of the second instruction set by the second processor set, causes the second processor set to carry out the steps of:

receiving the task data from the database, receiving quorum data from the database that indicates a particular participant set of one or more participants of the plurality of participants to participate in a particular task of the plurality of tasks, receiving through the second network interface the indication of whether the current task is interruptible while the current task is performed by the particular participant, and determining a particular time interval to perform the particular task based on the indication of whether the current task is interruptible while the current task is performed by the particular participant.

* * * * *

UNITED STATES PATENT AND TRADEMARK OFFICE
CERTIFICATE OF CORRECTION

PATENT NO.        : 8,286,183 B2                                              Page 1 of 1
APPLICATION NO.   : 11/255828
DATED             : October 9, 2012
INVENTOR(S)       : Randall Baird et al.

It is certified that error appears in the above-identified patent and that said Letters Patent is hereby corrected as shown below:

In the Claims

Column 30, Line 29, please delete "a" after --scheduling--.

Column 34, Line 1, please delete "the" after --whether--.

Signed and Sealed this
Fourth Day of December, 2012

David J. Kappos
*Director of the United States Patent and Trademark Office*